United States Patent
Tonami et al.

(10) Patent No.: US 7,423,949 B2
(45) Date of Patent: Sep. 9, 2008

(54) REPRODUCING APPARATUS AND METHOD, AND RECORDING AND REPRODUCING APPARATUS

(75) Inventors: Junichiro Tonami, Yokohama (JP); Yuuki Fujiwara, Yokosuka (JP)

(73) Assignee: Victor Company of Japan, Ltd., Yokohama (JP)

( * ) Notice: Subject to any disclaimer, the term of this patent is extended or adjusted under 35 U.S.C. 154(b) by 634 days.

(21) Appl. No.: 11/193,341

(22) Filed: Aug. 1, 2005

(65) Prior Publication Data

US 2006/0028749 A1    Feb. 9, 2006

(30) Foreign Application Priority Data

Aug. 4, 2004  (JP) ............................. 2004-227475
Jun. 8, 2005  (JP) ............................. 2005-168083

(51) Int. Cl.
*G11B 7/00* (2006.01)

(52) U.S. Cl. .................................. 369/59.21; 369/59.22

(58) Field of Classification Search ............. 369/59.21, 369/124.04, 124.06, 47.19, 59.22, 59.25
See application file for complete search history.

(56) References Cited

U.S. PATENT DOCUMENTS 6,492,918 B1 *  12/2002  Rezzi et al. .................... 341/68

FOREIGN PATENT DOCUMENTS

JP    10-106161    4/1998

* cited by examiner

*Primary Examiner*—Nabil Z Hindi
(74) *Attorney, Agent, or Firm*—Louis Woo

(57) ABSTRACT

A signal of a run-length-limited code is read out from a recording medium. The read-out signal is converted into a reproduced digital signal. A decoder subjects the reproduced digital signal to first decoding different from run length decoding to get a first decoded signal. Information bit streams are generated from the first decoded signal. The information bit streams are different in timing by 1-bit-correpsonding intervals. Run length decoders subject the information bit streams to run length decoding to get run-length-decoded bit streams respectively. Each of the run-length-decoded bit streams undergoes one of error correction and error detection. A decision is made as to which of the run-length-decoded bit streams is the smallest in error number on the basis of results of the one of error correction and error detection. The run-length-decoded bit stream being the smallest in error number is selected and outputted as a likeliest information bit stream.

14 Claims, 19 Drawing Sheets

REPRODUCING APPARATUS AND METHOD, AND RECORDING AND REPRODUCING APPARATUS

BACKGROUND OF THE INVENTION

1. Field of the Invention

This invention relates to a method and an apparatus for reproducing a signal of a run-length-limited code from a recording medium such as an optical disc. In addition, this invention relates to an apparatus for recording and reproducing a signal of a run-length-limited code on and from a recording medium such as an optical disc.

2. Description of the Related Art

Japanese patent application publication number 10-106161/1998 discloses an optical information reproducing apparatus based on a PRML (partial response maximum likelihood) system. In the apparatus of Japanese application 10-106161, information of a run-length-limited code is reproduced from an optical disc through a reproducing section, and a transversal filter subjects the reproduced waveform to partial-response equalization depending on tap coefficients. An example of the partial-response equalization is PR(1, X, X, 1) equalization. The output signal of the transversal filter is decoded into binary data by a maximum-likelihood decoder. A parameter setting device selects intersymbol-interference imparting values in the partial-response equalization in accordance with the characteristics of the reproduced waveform. Furthermore, the parameter setting device sets the tap coefficients of the transversal filter and a decision point signal level for the maximum likelihood decoder as parameters in response to the selected intersymbol-interference imparting values.

In the apparatus of Japanese application 10-106161, the parameter setting device includes a memory loaded with parameter-setting reference data. A target after-equalization waveform is determined on the basis of the parameter-setting reference data and the selected intersymbol-interference imparting values. The apparatus of Japanese application 10-106161 premises that the optical disc has predetermined pits (reference pits) representative of the parameter-setting reference data. A reference-data signal is reproduced from the predetermined pits in the optical disc. The tap coefficients of the transversal filter are set to equalize the waveform of the reproduced reference-data signal to the target after-equalization waveform.

In the apparatus of Japanese application 10-106161, the parameter setting device also includes an error-rate deciding device which compares the binary data outputted from the maximum-likelihood decoder and the parameter-setting reference data fed from the memory to calculate the rate of bit errors therebetween. The error-rate deciding device judges whether or not the calculated bit error rate is within an allowable range. The selection of intersymbol-interference imparting values are responsive to the result of the judgment by the error-rate deciding device. The tap coefficients of the transversal filter and the decision point signal level for the maximum-likelihood decoder which occur when the calculated bit error rate is within the allowable range are actually used in the partial-response equalization and the decoding procedure.

In the case where an optical disc stores a digital signal, a signal read out from the optical disc has an analog waveform representative of the digital signal. Generally, a phase locked loop (PLL) circuit is used to reproduce a bit clock signal from the read-out signal. A typical digital signal recorded on an optical disc has various-run-length segments including short-run-length segments, mid-run-length segments, and long-run-length segments. An example of the short-run-length segments is a 2T segment, where T denotes a bit period. As the density of digital information recorded on an optical disc is higher, there occurs a lower level of a signal read out from the optical disc which corresponds to a short-run-length segment (for example, a 2T segment) of the digital information. A very low signal level makes it difficult for a PLL circuit to accurately reproduce a bit clock signal from the read-out signal. In such a case, the PLL circuit moves out of a state locked up with respect to the read-out signal, and hence a bit slip tends to occur. Due to the bit slip, some bits of the digital information are lost along a time base. For example, bits of the digital information continue to be lost until the PLL circuit returns to the locked-up state.

Viterbi decoding includes MAP (maximum a posteriori probability) decoding or SOVA (soft output viterbi algorithm) decoding. The viterbi decoding has the ability to correct errors in a bit stream reproduced from an optical disc. Specifically, the viterbi decoding finds the likeliest stream of bits from a signal read out from the optical disc. Once bits have been lost due to a bit slip, even the viterbi decoding can not recover the lost bits. Thus, the bit slip increases the error rate.

A usual digital signal recorded on an optical disc has sync signals placed at the heads of signal blocks. In the event that a bit slip occurs during the read-out of the digital signal from the optical disc, each reproduced bit position moves out of correct one. Then, the reproduced bit position can be returned to correct one when a sync signal is detected in the read-out signal. In this case, the whole of a signal block immediately preceding the detected sync signal fails to be recovered. That signal block is recognized as an error.

Generally, a digital signal undergoes block-by-block modulation (encoding) before being recorded on an optical disc. Examples of the block-by-block modulation are D4-6 modulation, 8-16 modulation, and 1-7 pp modulation including a run length limiting process and a DSV (digital sum variation or digital sum value) control process. During the reproduction of the digital signal from the optical disc, the reproduced digital signal undergoes block-by-block demodulation (decoding) inverse with respect to the modulation. In the event that a bit slip occurs, the demodulation can not correctly recover some bits of the digital signal.

SUMMARY OF THE INVENTION

It is a first object of this invention to provide a reproducing apparatus which can prevent the error rate from being significantly increased by the occurrence of a bit slip.

It is a second object of this invention to provide a reproducing method which can prevent the error rate from being significantly increased by the occurrence of a bit slip.

It is a third object of this invention to provide a recording and reproducing apparatus which can prevent the error rate from being significantly increased by the occurrence of a bit slip.

A first aspect of this invention provides a reproducing apparatus comprising first means for reading out a signal of a run-length-limited code from a recording medium; an A/D converter for converting the signal read out by the first means into a reproduced digital signal; a decoder for subjecting the reproduced digital signal to first decoding different from run length decoding to get a first decoded signal; second means for generating a plurality of information bit streams from every block of the first decoded signal between sync signals, the information bit streams being different in timing by 1-bit-corresponding intervals; run length decoders for subjecting the information bit streams to run length decoding to get run-length-decoded bit streams respectively; third means for subjecting each of the run-length-decoded bit streams to one of error correction and error detection; fourth means for deciding which of the run-length-decoded bit streams is the smallest in error number on the basis of results of the one of error correction and error detection; and a selector for selecting and outputting the run-length-decoded bit stream being the smallest in error number as a likeliest information bit stream.

A second aspect of this invention is based on the first aspect thereof, and provides a reproducing apparatus wherein the third means comprises means for extracting specified data pieces from fixed positions in every block of each of the run-length-decoded bit streams, means for collecting a prescribed number of the extracted specified data pieces to form a code word for each of the run-length-decoded bit streams, means for decoding the code words and implementing the one of error correction and error detection on the code words to get error signals representative of numbers of errors in the code words for the run-length-decoded bit streams; and wherein the fourth means and the selector comprise means for comparing the error signals to decide which of the code words is the smallest in error number, and means for selecting and outputting the run-length-decoded bit stream corresponding to the code word being the smallest in error number as the likeliest information bit stream.

A third aspect of this invention is based on the first aspect thereof, and provides a reproducing apparatus wherein the second means comprises a tap delay circuit for non-delaying and delaying every block of the first decoded signal by terms different by 1-bit-correpsonding intervals to generate the information bit streams; wherein the run length decoders comprise means for generating error signals in cases where unnatural code words and unnatural state transitions occur during the run length decoding; and wherein the fourth means comprises counters for counting the error signals generated by the run length decoders for every prescribed number of bits, and for accumulating results of the counting during prescribed terms to get error count numbers respectively, and a comparator for comparing the error count numbers to decide which of the count numbers is the smallest, and for designating one of the run-length-decoded bit streams which corresponds to the decided smallest count number as the run-length-decoded bit stream being the smallest in error number.

A fourth aspect of this invention is based on the third aspect thereof, and provides a reproducing apparatus wherein the run length decoders obtain error decision results during the run length decoding and calculate the differences between the error decision results and the information bit streams as Euclidean distances, and generate the error signals in response to ones of (1) the squares of the Euclidean distances and (2) the absolute values of the Euclidean distances.

A fifth aspect of this invention is based on the third aspect thereof, and provides a reproducing apparatus wherein the selector comprises a sync signal detector for detecting every sync signal in the first decoded signal, and the comparator detects occurrence of a bit slip in response to the error count numbers; and wherein the selector estimates a likely bit position immediately after the occurrence of the bit slip in response to the sync signal detected by the sync signal detector when the comparator detects the occurrence of the bit slip, and the selector changes the selected and outputted run-length-decoded bit stream from one to another at a moment corresponding to the estimated likely bit position immediately after the occurrence of the bit slip.

A sixth aspect of this invention is based on the fifth aspect thereof, and provides a reproducing apparatus wherein the comparator generates a choice information signal for changing the selected and outputted run-length-decoded bit stream from one to another when detecting the occurrence of the bit slip; and wherein the selector comprises means for estimating the likely bit position immediately after the occurrence of the bit slip in response to the choice information signal generated by the comparator and the sync signal detected by the sync signal detector, and for changing the selected and outputted run-length-decoded bit stream from one to another at the moment corresponding to the estimated likely bit position immediately after the occurrence of the bit slip.

A seventh aspect of this invention provides a reproducing apparatus comprising first means for reading out a signal of a run-length-limited code from a recording medium; an A/D converter for converting the signal read out by the first means into a reproduced digital signal; a decoder for subjecting the reproduced digital signal to first decoding different from run length decoding to get a first decoded signal; second means for generating a plurality of information bit streams from every block of the first decoded signal between sync signals, the information bit streams being different in timing by 1-bit-corresponding intervals; run length decoders for subjecting the information bit streams to run length decoding to get run-length-decoded bit streams respectively; third means for subjecting each of the run-length-decoded bit streams to one of error correction and error detection; fourth means for deciding which of the run-length-decoded bit streams is the smallest in error number on the basis of results of the one of error correction and error detection; and a selector for selecting and outputting one among the information bit streams which corresponds to the run-length-decoded bit stream being the smallest in error number as a likeliest information bit stream.

An eighth aspect of this invention is based on the seventh aspect thereof, and provides a reproducing apparatus wherein the second means comprises a tap delay circuit for non-delaying and delaying every block of the first decoded signal by terms different by 1-bit-corresponding intervals to generate the information bit streams; wherein the run length decoders comprise means for generating error signals in cases where unnatural code words and unnatural state transitions occur during the run length decoding; wherein the fourth means comprises counters for counting the error signals generated by the run length decoders for every prescribed number of bits, and for accumulating results of the counting during prescribed terms to get error count numbers respectively, and a comparator for comparing the error count numbers to decide which of the count numbers is the smallest, and for designating one of the information bit streams which corresponds to the decided smallest count number as the information bit stream being the smallest in error number; wherein the selector comprises a sync signal detector for detecting every sync signal in the first decoded signal, and the comparator detects occurrence of a bit slip in response to the error count numbers; and wherein the selector estimates a likely bit position immediately after the occurrence of the bit slip in response to the sync signal detected by the sync signal detector when the comparator detects the occurrence of the bit slip, and the selector changes the selected and outputted information bit stream from one to another at a moment corresponding to the estimated likely bit position immediately after the occurrence of the bit slip.

A ninth aspect of this invention is based on the eighth aspect thereof, and provides a reproducing apparatus wherein the comparator generates a choice information signal for changing the selected and outputted information bit stream from one to another when detecting the occurrence of the bit slip; and wherein the selector comprises means for estimating the likely bit position immediately after the occurrence of the bit slip in response to the choice information signal generated by the comparator and the sync signal detected by the sync signal detector, and for changing the selected and outputted information bit stream from one to another at the moment corresponding to the estimated likely bit position immediately after the occurrence of the bit slip.

A tenth aspect of this invention is based on the eighth aspect thereof, and provides a reproducing apparatus wherein the selector comprises means for counting pulses of a fixed-frequency clock signal from the next sync signal position detected by the sync signal detector, and means for estimating a position at which the bit stream having the smallest counting of the pulses is changed to be the likely bit position immediately after the occurrence of the bit slip.

An eleventh aspect of this invention provides a reproducing method comprising the steps of reading out a signal of a run-length-limited code from a recording medium; converting the read-out signal into a reproduced digital signal; subjecting the reproduced digital signal to first decoding different from run length decoding to get a first decoded signal; generating a plurality of information bit streams from every block of the first decoded signal between sync signals, the information bit streams being different in timing by 1-bit-corresponding intervals; subjecting the information bit streams to run length decoding to get run-length-decoded bit streams; subjecting each of the run-length-decoded bit streams to one of error correction and error detection; deciding which of the run-length-decoded bit streams is the smallest in error number on the basis of results of the one of error correction and error detection; and selecting and outputting one among the information bit streams which corresponds to the run-length-decoded bit stream being the smallest in error number as a likeliest information bit stream.

A twelfth aspect of this invention provides a recording and reproducing apparatus comprising a parity generation circuit for generating error correction parity signals in response to input digital information, and for adding the generated error correction parity signals to the input digital information to form parity-added digital information; a run length encoding circuit for subjecting the parity-added digital information to run length encoding to get a signal of a run length limited code; first means for recording the signal of the run length limited code on a recording medium; second means for reading out the signal of the run-length-limited code from the recording medium; an A/D converter for converting the signal read out by the second means into a reproduced digital signal; a decoder for subjecting the reproduced digital signal to first decoding different from run length decoding to get a first decoded signal; third means for generating a plurality of information bit streams from every block of the first decoded signal between sync signals, the information bit streams being different in timing by 1-bit-corresponding intervals; run length decoders for subjecting the information bit streams to run length decoding to get run-length-decoded bit streams respectively; fourth means for subjecting each of the run-length-decoded bit streams to one of error correction and error detection; fifth means for deciding which of the run-length-decoded bit streams is the smallest in error number on the basis of results of the one of error correction and error detection; and a selector for selecting and outputting one among the information bit streams which corresponds to the run-length-decoded bit stream being the smallest in error number as a likeliest information bit stream.

A thirteenth aspect of this invention is based on the eighth aspect thereof, and provides a reproducing apparatus wherein the selector comprises means for counting pulses of a fixed-frequency clock signal during a term defined by the sync signal detected by the sync signal detector, and means for estimating the likely bit position immediately after the occurrence of the bit slip in response to results of the counting of the pulses.

A fourteenth aspect of this invention provides a recording and reproducing apparatus comprising a parity generation circuit for generating error correction parity signals in response to input digital information, and for adding the generated error correction parity signals to the input digital information to form parity-added digital information; a run length encoding circuit for subjecting the parity-added digital information to run length encoding to get a first signal of a run length limited code; first means for recording the first signal of the run length limited code on a first recording medium; second means for reading out a second signal of the run-length-limited code from one of the first recording medium and a second recording medium which has been recorded by an apparatus different from the present apparatus, the second recording medium being different from the first recording medium; an A/D converter for converting the signal read out by the second means into a reproduced digital signal; a decoder for subjecting the reproduced digital signal to first decoding different from run length decoding to get a first decoded signal; third means for generating a plurality of information bit streams from every block of the first decoded signal between sync signals, the information bit streams being different in timing by 1-bit-corresponding intervals; run length decoders for subjecting the information bit streams to run length decoding to get run length decoded bit streams respectively; fourth means for subjecting each of the run-length-decoded bit streams to one of error correction and error detection; fifth means for deciding which of the run-length-decoded bit streams is the smallest in error number on the basis of results of the one of error correction and error detection; and a selector for selecting and outputting one among the information bit streams which corresponds to the run-length-decoded bit stream being the smallest in error number as a likeliest information bit stream.

This invention has an advantage as follows. In this invention, a plurality of information bit streams is generated from a reproduced signal. The information bit streams are different in timing by 1-bit-corresponding intervals. The information bit streams are subjected to run length decoding, and are hence converted into run-length-decoded bit streams respectively. For every signal block between sync signals, the run-length-decoded bit streams are subjected to error correction or error detection. A decision is made as to which of the run-length-decoded bit streams has the fewest errors on the basis of the results of the error correction or the error detection. One of the information bit streams which corresponds to the fewest-error run-length-decoded bit stream is selected and outputted as the likeliest information bit stream. Accordingly, in the event that a bit slip occurs in the reproduced signal, it is possible to restrain the error rate to a small value.

DETAILED DESCRIPTION OF THE INVENTION

FIRST EMBODIMENT

Figure 1:
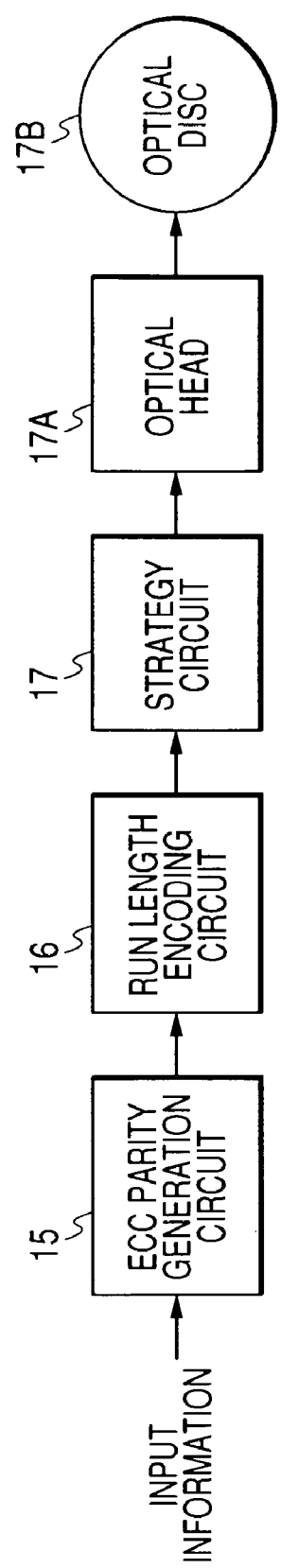
FIG. 1 is a block diagram of the recording side of a recording and reproducing apparatus in a first embodiment of this invention.

FIG. 1 shows the recording side of a recording and reproducing apparatus in a first embodiment of this invention. As shown in FIG. 1, the recording side of the apparatus includes an ECC parity generation circuit 15, a run length encoding circuit 16, a strategy circuit 17, and an optical head 17A which are sequentially connected in that order. The optical head 17A can act on an optical disc 17B.

The ECC parity generation circuit 15 receives input digital information to be recorded. The ECC parity generation circuit 15 produces parity signals (ECC parity signals) in response to the input digital information. The parity signals include, for example, RS (Reed-Solomon) code signals and LDPC (low-density parity-check code) signals. The ECC parity generation circuit 15 adds the parity signals (the ECC parity signals) to the input digital information to get parity-added digital information. The ECC parity generation circuit 15 outputs the parity-added digital information to the run length encoding circuit 16.

The run length encoding circuit 16 implements the run length encoding of the parity-added digital information. Specifically, the run length encoding circuit 16 converts the parity-added digital information into a sequence of words of a run length limited code through prescribed digital modulation. The run length encoding circuit 16 exposes the sequence of words of the run length limited code to DSV (digital sum variation) control. The run length encoding circuit 16 outputs the sequence of words of the run length limited code to the strategy circuit 17.

The strategy circuit 17 converts the sequence of words of the run length limited code into a high-frequency pulse train for modulation of a laser beam. The strategy circuit 17 feeds the high-frequency pulse train to the optical head 17A. The optical head 17A includes a laser diode for emitting a laser beam toward the optical disc 17B, and a drive circuit for the laser diode. The drive circuit controls the laser diode in response to the high-frequency pulse train so that the emitted laser beam is modulated in accordance therewith. Thus, the optical head 17A applies the laser beam to the optical disc 17B and modulates the laser beam in accordance with the high-frequency pulse train, thereby recording the sequence of words of the run length limited code on the optical disc 17B. As a result, the input digital information fed to the ECC parity generation circuit 15 is recorded on the optical disc 17B.

Figure 2:
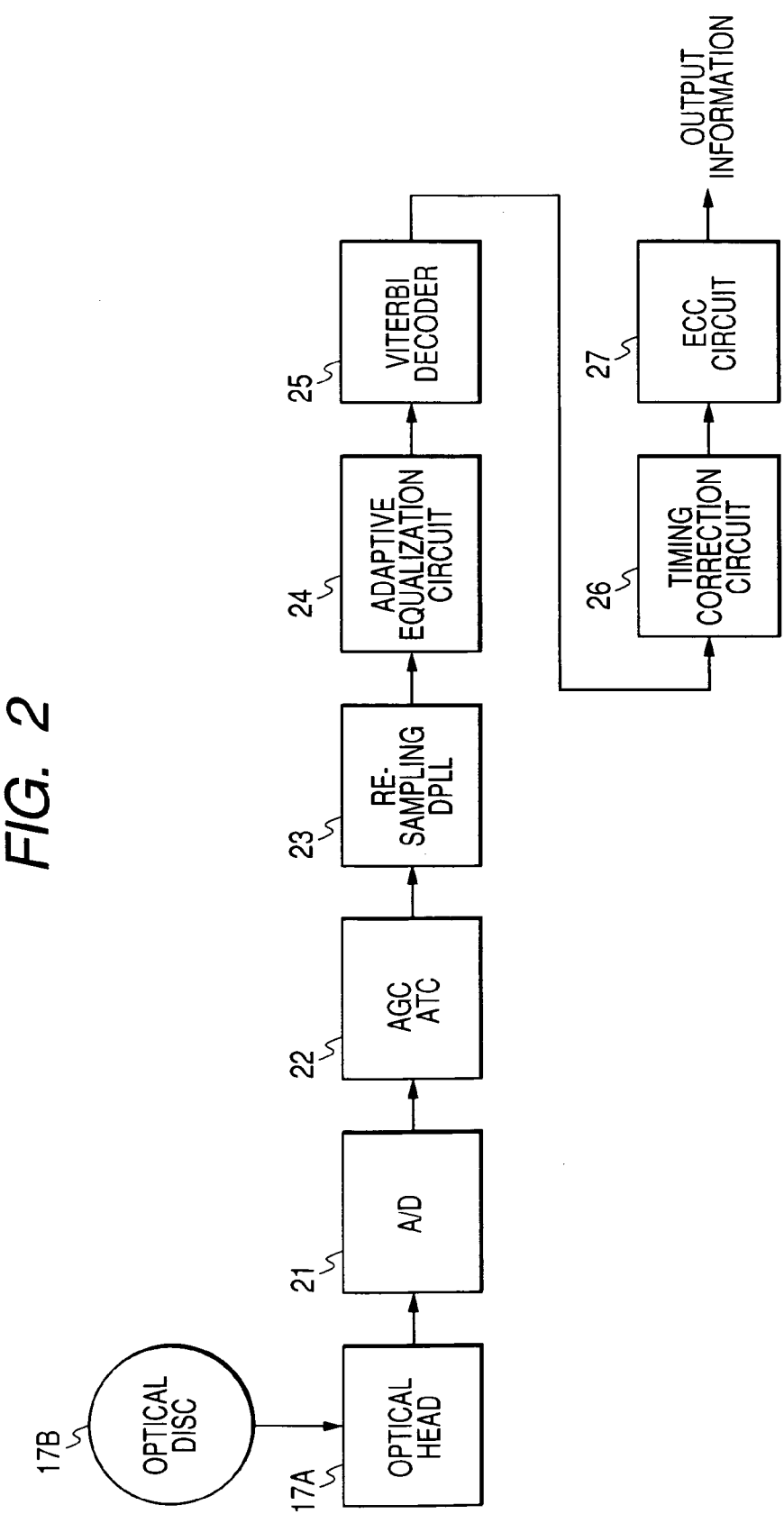
FIG. 2 is a block diagram of the reproducing side of the recording and reproducing apparatus in the first embodiment of this invention.

FIG. 2 shows the reproducing side of the apparatus in the first embodiment of this invention. As shown in FIG. 2, the reproducing side of the apparatus includes an optical head 17A, an A/D converter 21, an AGC and ATC circuit 22, a re-sampling DPLL (digital phase locked loop) 23, an adaptive equalization circuit 24, a viterbi decoder 25, a timing correction circuit 26, and an ECC circuit 27 which are sequentially connected in that order. The optical head 17A can act on an optical disc 17B.

In general, the optical disc 17B stores a signal of a run length limited code which has been recorded by the recording side in FIG. 1. It should be noted that the optical disc 17B may store a signal of a run length limited code which has been recorded by a recording apparatus different from the recording side in FIG. 1. Furthermore, the optical disc 17B in FIG. 2 may be different from that in FIG. 1.

The optical head 17A reads out the recorded signal from the optical disc 17B. The optical head 17A outputs the readout signal to the A/D converter 21. The A/D converter 21 changes the output signal of the optical head 17A into a corresponding digital signal. Specifically, the A/D converter 21 periodically samples the output signal of the optical head 17A in response to a fixed-frequency master clock signal (a fixed-frequency system clock signal), and converts every resultant sample into a digital sample. The A/D converter 21 outputs the digital signal to the AGC and ATC circuit 22. The AGC and ATC circuit 22 subjects the output signal of the A/D converter 21 to automatic gain control (AGC) for providing a constant signal amplitude and also automatic threshold control (ATC) including proper direct-current (DC) control of threshold values used for two-value comparison. The AGC and ATC circuit 22 outputs the resultant signal to the re-sampling DPLL 23.

The re-sampling DPLL 23 converts the output signal (the first digital signal) of the AGC and ATC circuit 22 into a second digital signal. The re-sampling DPLL 23 includes a digital PLL (phase locked loop) circuit having a closed loop. The digital PLL circuit re-samples the output signal of the AGC and ATC circuit 22 in response to a bit clock signal to get the second digital signal (the re-sampling resultant signal). A timing related to samples of the output signal of the AGC and ATC circuit 22 is determined by the system clock signal. A timing related to samples of the second digital signal is determined by the bit clock signal. Preferably, samples of the second digital signal have a phase of 180° with respect to the bit clock signal. Samples of the second digital signal may have a phase of 0° with respect to the bit clock signal. The re-sampling implemented by the digital PLL circuit includes at least one of interpolation and decimation designed to generate samples of the re-sampling-resultant signal from samples of the output signal of the AGC and ATC circuit 22. The re-sampling DPLL 23 outputs the second digital signal (the re-sampling-resultant signal) to a transversal filter within the adaptive equalization circuit 24. The second digital signal is also referred to as the main digital signal or the main output signal of the re-sampling DPLL 23.

The re-sampling DPLL 23 includes an interpolator which estimates every sample at a given phase point (for example, a phase point of 0° or 180°) with respect to the bit clock signal from the output signal of the AGC and ATC circuit 22. Thus, the interpolator generates a sequence of given-phase-point data samples. The interpolator outputs the sequence of given-phase-point data samples to the transversal filter within the adaptive equalization circuit 24 as the main digital signal (the second digital signal or the re-sampling-resultant signal). The re-sampling DPLL 23 also includes a zero-cross detector for sensing every point (every zero-cross point) at which the sequence of given-phase-point data samples crosses a zero level (a 0 level). The zero-cross detector generates O-point information which represents every sensed zero-cross point in the bit clock unit. Specifically, the zero-cross detector decides whether or not every phase-point data sample corresponds to a zero-cross point. The zero-cross detector generates O-point information in response to the result of the decision. Furthermore, the zero-cross detector generates a phase error in response to every sensed zero-cross point. In the re-sampling DPLL 23, the timing of the re-sampling or the frequency and phase of the re-sampling are locked in response to the levels represented by zero-cross-point-corresponding samples of the second digital signal so that the phase error will be equal to "0". The re-sampling DPLL 23 outputs the O-point information to the adaptive equalization circuit 24 as a sub output signal.

The adaptive equalization circuit 24 subjects the main output signal of the re-sampling DPLL 23 (that is, the second digital signal outputted from the re-sampling DPLL 23) to automatic waveform equalization in response to the O-point information fed from the re-sampling DPLL 23. The automatic waveform equalization corresponds to a process of providing the signal in question with a partial-response (PR) characteristic. The adaptive equalization circuit 24 outputs the equalization-resultant signal to the viterbi decoder 25. The viterbi decoder 25 subjects the equalization-resultant signal to viterbi decoding. Preferably, the viterbi decoding is of a hard-decision type. The hard-decision viterbi decoding may be replaced by soft-decision viterbi decoding such as SOVA (soft output viterbi algorithm) decoding or MAP (maximum a posteriori probability) decoding. As a result of the viterbi decoding, the viterbi decoder 25 generates a first decoding-resultant signal (a viterbi-decoded signal). The viterbi decoder 25 outputs the first decoding-resultant signal, that is, the viterbi-decoded signal, to the timing correction circuit 26.

An example of the viterbi decoder 25 is designed as follows. The viterbi decoder 25 includes a memory loaded with a plurality of candidate recovered data pieces. Also, the viterbi decoder 25 includes a section for calculating branch metric values from samples of the output signal of the adaptive equalization circuit 24. Furthermore, the viterbi decoder 25 includes a section for accumulating the branch metric values into path metric values respectively. The path metric values relate to the candidate recovered data pieces, respectively. In addition, the viterbi decoder 25 includes a section for detecting the smallest value among the path metric values, and generating a selection signal corresponding to the detected smallest path metric value. The selection signal is applied to the memory. One of the candidate recovered data pieces which corresponds to the smallest path metric value is elected in response to the selection signal, being outputted from the memory to the timing correction circuit 26 as the first decoding-resultant signal. The smallest path metric value may be used to generate likelihood information about the first decoding-resultant signal. The likelihood information may be outputted to the timing correction circuit 26.

Preferably, the viterbi decoder 25 is designed to implement a hard decision to produce a 2-value (binary) decoding-resultant signal. Alternatively, the viterbi decoder 25 may be designed to implement a soft decision. In this case, the first decoding-resultant signal may be outputted from the viterbi decoder 25 together with the likelihood information. The viterbi decoder 25 may include an APP decoder (a posterior probability decoder).

Basically, the timing correction circuit 26 subjects the first decoding-resultant signal, that is, the output signal of the viterbi decoder 25, to run length decoding to get a second decoding-resultant signal. The run length decoding by the timing correction circuit 26 is inverse with respect to the run length encoding by the run length encoding circuit 16 in FIG. 1. The timing correction circuit 26 outputs the second decoding-resultant signal to the ECC circuit 27. As will be explained later, the timing correction circuit 26 is provided with measures against signal errors caused by bit slips.

The ECC circuit 27 subjects the second decoding-resultant signal (that is, the output signal of the timing correction circuit 26) to error correction responsive to parity signals contained therein, thereby recovering original digital information. The parity signals include, for example, RS code signals and LDPC signals. The ECC circuit 27 is a counterpart of the ECC parity generation circuit 15 in FIG. 1. The ECC circuit 27 outputs the recovered digital information.

Specifically, the timing correction circuit 26 non-delays and delays the output signal of the viterbi decoder 25 by prescribed different lengths of time to get a plurality of information bit streams which relate to respective timings spaced at 1-bit-corresponding intervals. The timing correction circuit 26 subjects the information bit streams to run length decoding to get run-length-decoded signals (run-length-decoded bit streams) respectively. The timing correction circuit 26 extracts bits in every prescribed place from the run-length-decoded signals, and combines the extracted bits into code words. The code words originate from the run-length-decoded signals, respectively.

The timing correction circuit 26 detects an error or errors in the code words, and generates error-related signals in response to the results of error detection. The error-related signals represent the numbers of detected errors, respectively. At a timing corresponding to every prescribed place, the timing correction circuit 26 selects the likeliest one from the run-length-decoded signals in response to the error-related signals. The timing correction circuit 26 outputs the selected likeliest signal to the ECC circuit 27 as the second decoding-resultant signal.

Figure 3:
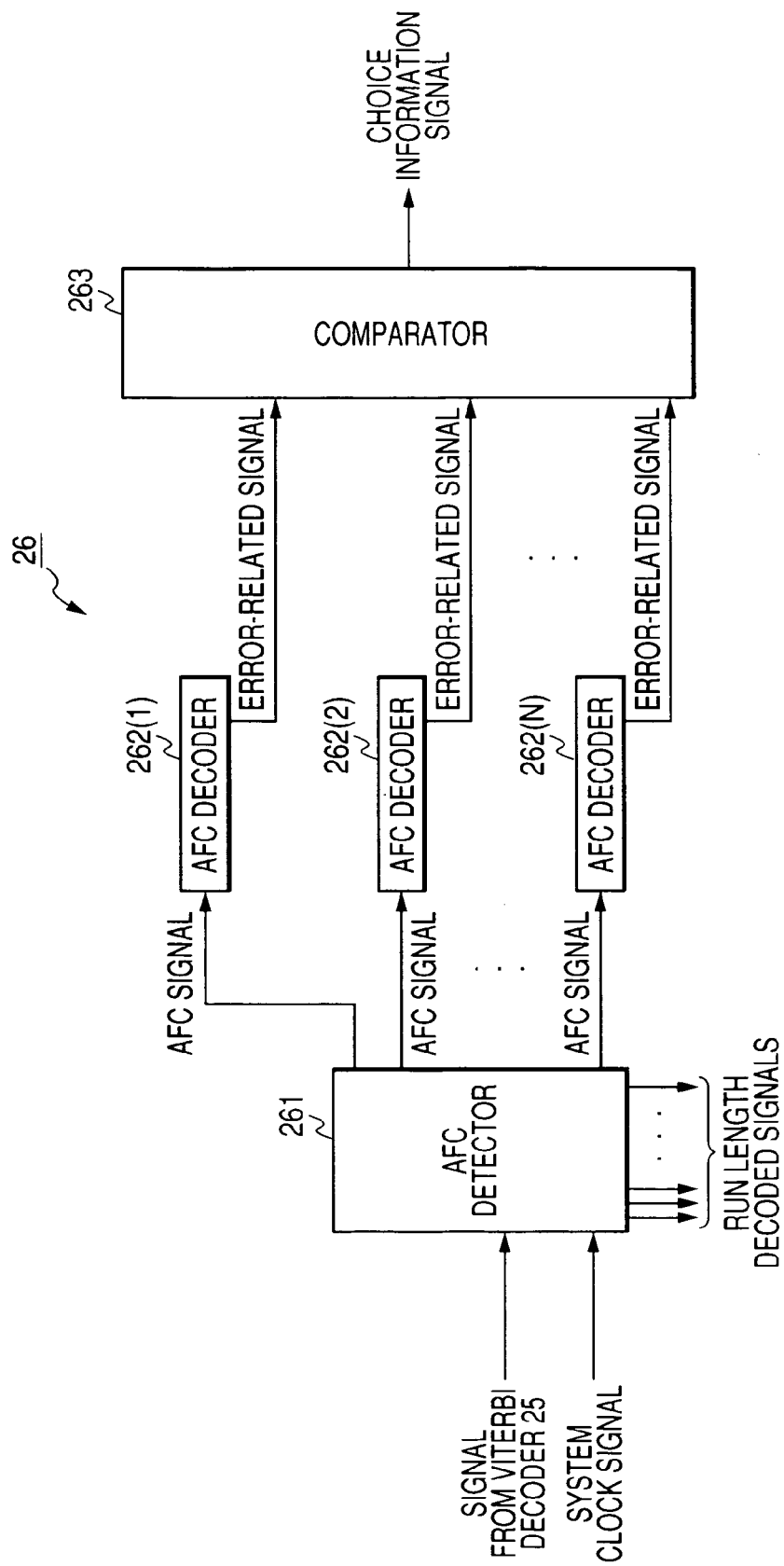
FIG. 3 is a block diagram of a first portion of a timing correction circuit in FIG. 2.
Figure 4:
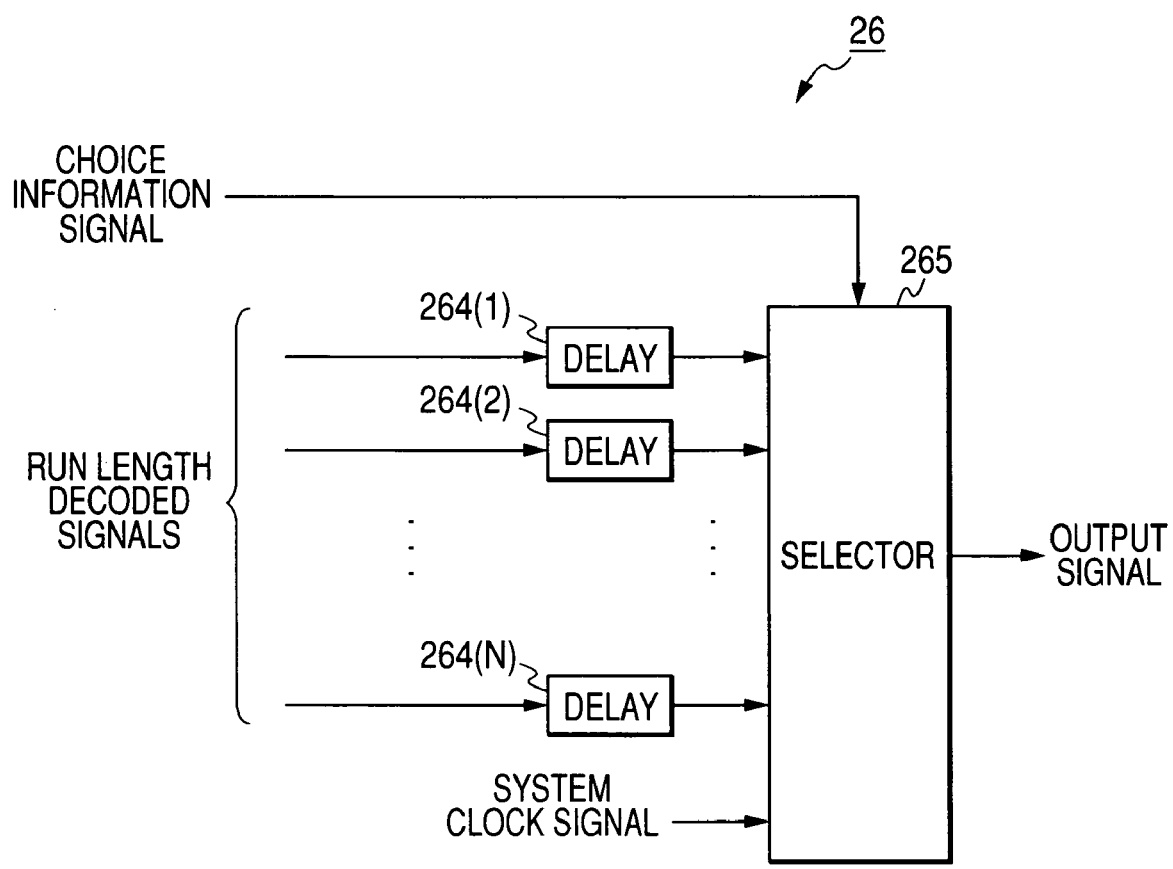
FIG. 4 is a block diagram of a second portion of the timing correction circuit in FIG. 2.

As shown in FIGS. 3 and 4, the timing correction circuit 26 includes an AFC detector 261, AFC decoders 262(1), 262(2), . . . , and 262(N), a comparator 263, delay devices 264(1), 264(2), . . . , and 264(N), and a selector 265. The number of the AFC decoders 262(1), 262(2), . . . , and 262(N), and the number of the delay devices 264(1), 264(2), . . . , and 264(N) are equal to a predetermined integer N (for example, 3 or more).

The AFC detector 261 receives the first decoding-resultant signal from the viterbi decoder 25. The AFC detector 261 non-delays and delays the first decoding-resultant signal by the prescribed different lengths of time to get the information bit streams which relate to the respective timings spaced at 1-bit-corresponding intervals. In addition, the AFC detector 261 receives the system clock signal from a suitable device (not shown). The AFC detector 261 detects address field code words (AFC) in the respective information bit streams to generate AFC signals while using the system clock signal as a reference timing signal. The generated AFC signals relate to respective timings spaced at 1-bit-corresponding intervals. The AFC detectors 261 outputs the AFC signals to the AFC decoders 262(1), 262(2), . . . , and 262(N) respectively. The devices 262(1), 262(2), . . . , and 262(N) decode the AFC signals, thereby generating error-related signals respectively. Each of the error-related signals is either an error signal or a non-error signal. The AFC decoders 262(1), 262(2), . . . , and 262(N) output the error-related signals to the comparator 263. The comparator 263 selects one from the error-related signals, and generates a choice information signal in response to the selected error-related signal. The comparator 263 outputs the choice information signal to the selector 265.

As previously mentioned, the AFC detector 261 non-delays and delays the output signal of the viterbi decoder 25 by the prescribed different lengths of time to get the information bit streams which relate to the respective timings spaced at 1-bit-corresponding intervals. The AFC detector 261 subjects the information bit streams to run length decoding to get run-length-decoded signals (run-length-decoded bit streams). The run-length-decoded signals relate to respective timings spaced at 1-bit-corresponding intervals. The AFC detector 261 outputs the run-length-decoded signals to the delay devices 264(1), 264(2), . . . , and 264(N) respectively. The delay devices 264(1), 264(2), . . . , and 264(N) delay the run-length-decoded signals by a prescribed time interval to get delayed information bit streams, respectively. The delay devices 264(1), 264(2), . . . , and 264(N) output the delayed information bit streams to the selector 265. The delayed information bit streams are different in timing by 1-bit-corresponding intervals. The selector 265 receives the system clock signal from the suitable device (not shown). The device 265 selects the likeliest one from the delayed information bit streams in response to the choice information signal while using the system clock signal as a reference timing signal. The selector 265 outputs the selected information bit stream to the ECC circuit 27 as the second decoding-resultant signal. The signal delay provided by the delay devices 264(1), 264(2), . . . , and 264(N) is chosen to harmonize the timings of the delayed information bit streams with the timing of the choice information signal.

The number of the AFC decoders 262(1), 262(2), . . . , and 262(N) is equal to the number of the AFC signals outputted from the AFC detector 261. Since the AFC signals result from signal shifts different by 1-bit-corresponding intervals, the number of the AFC signals corresponds to a bit shift quantity. The number of the AFC decoders 262(1), 262(2), . . . , and 262(N) also corresponds to the bit shift quantity. To detect a bit slip, it is necessary to generate AFC signals whose number corresponds to at least the quantity of the bit slip. Therefore, it is preferable to provide AFC decoders whose number corresponds to an estimated bit slip quantity or more. Only AFC decoders whose number corresponds to less than the estimated bit slip quantity may be provided. In this case, at least one of the AFC decoders is used twice.

It should be noted that the comparator 263, the selector 265, and others constitute a comparing and selecting means of this invention.

Figure 5:
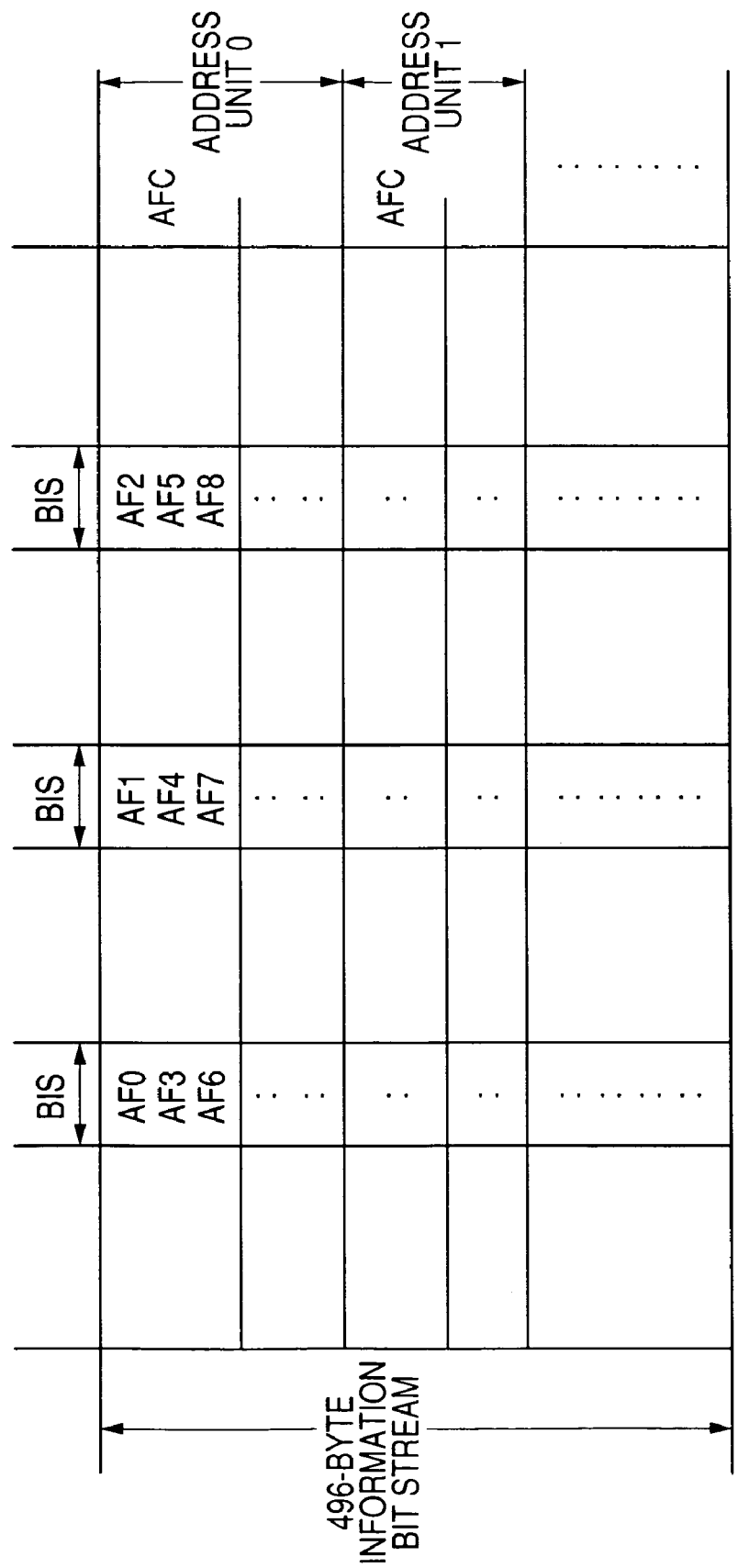
FIG. 5 is a diagram of the data structure of one ECC cluster (one ECC block) in a picket-code signal.

For example, a picket code is used for a signal recorded on the optical disc 17B. FIG. 5 shows the data structure of one ECC cluster (one ECC block) in a picket-code signal. In FIG. 5, one row corresponds to one sync block being one recording unit. Every sync block has a sync signal at its head. Every sync block contains user data in which portions of burst indicating subcodes (BIS) are embedded in the form of three information bit groups occupying predetermined positions. The portions of BIS have a size of about 1 byte, and are referred to as BIS signals. In FIG. 5, the columns denoted by "BIS" are fully filled with BIS signals.

A code word is generated by combining portions of BIS, that is, BIS signals. The code word contains a 9-byte AFC (address field code word) for which error correction or error detection can be performed. A BIS cluster has an address filed (AF) as data, and thereby the present address can be known as information.

Figure 6:
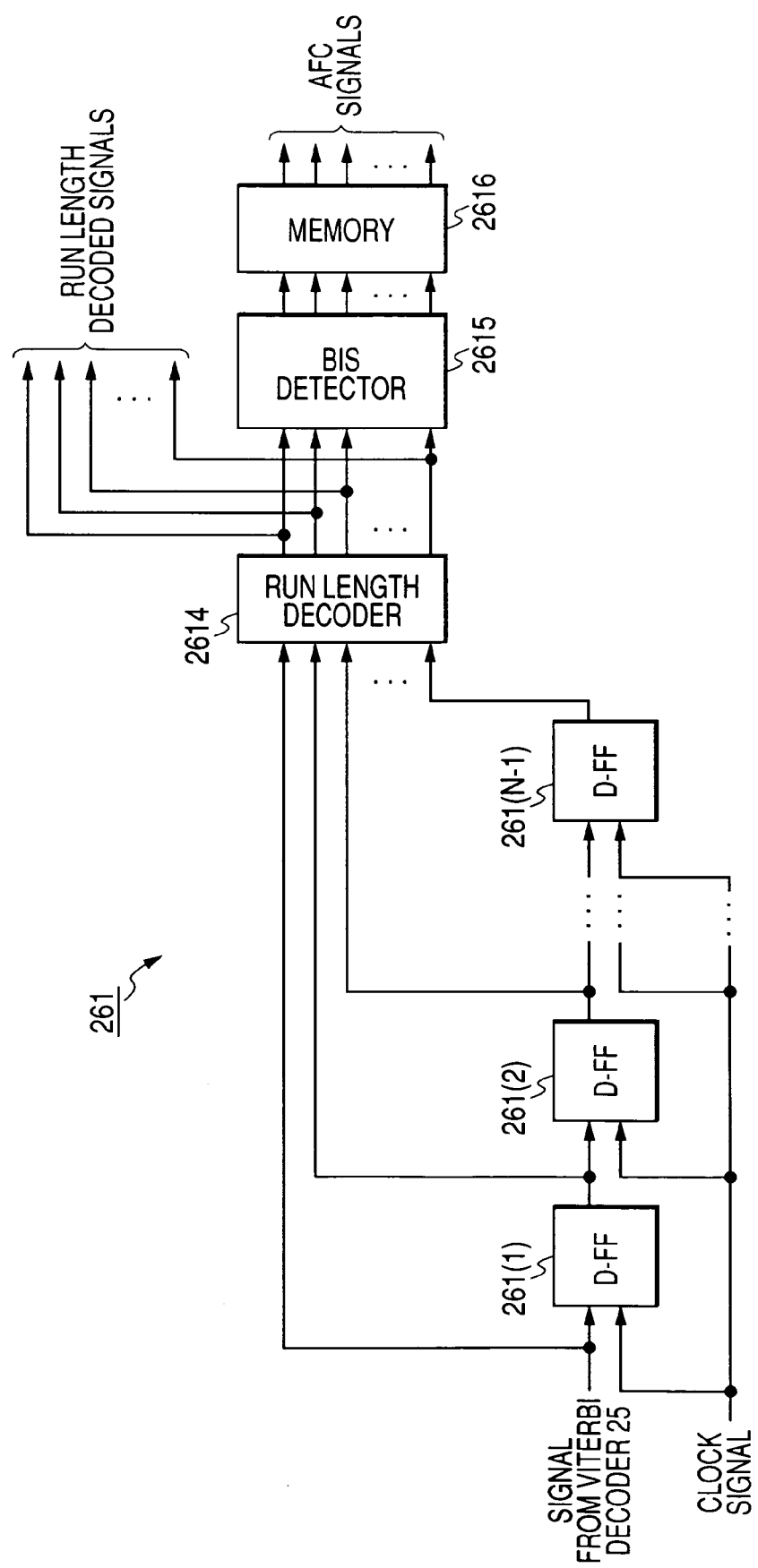
FIG. 6 is a block diagram of an AFC detector in FIG. 3.

As shown in FIG. 6, the AFC detector 261 includes D flip-flops (D-FF) 261(1), 261(2), . . . , and 261(N−1), a run length decoder 2614, a BIS detector 2615, and a memory 2616. The output signal of the viterbi decoder 25 is directly applied to the run length decoder 2614 as a non-delayed information bit stream.

The D flip-flops 261(1), 261(2), . . . , and 261(N−1) are connected in cascade to form a delay line. Each of the D flip-flops 261(1), 261(2), . . . , and 261(N−1) provides a signal delay corresponding to one bit while being driven by a clock signal (for example, the system clock signal) fed from a suitable device (not shown). The output signal of the viterbi decoder 25 propagates through the delay line while being delayed by the D flip-flops 261(1), 261(2), . . . , and 261(N−1). Information bit streams which appear at the output sides of the D flip-flops 261(1), 261(2), . . . , and 261(N−1) are delayed from the non-delayed information bit stream by time intervals corresponding to 1 bit, 2 bits, . . . , and (N−1) bits respectively. The delayed information bit streams are applied to the run length decoder 2614.

The run length decoder 2614 subjects the non-delayed and delayed information bit streams to run length decoding to generate respective run-length-decoded signals which are different in timing by 1-bit-corresponding intervals. The run length decoder 2614 outputs the run-length-decoded signals to the delay devices 264(1), 264(2), . . . , and 264(N) respectively. The run length decoder 2614 also outputs the run-length-decoded signals to the BIS detector 2615.

The run-length-decoded signals fed in parallel to the BIS detector 2615 are different in timing by 1-bit-corresponding intervals. One of the run-length-decoded signals is used as a major run-length-decoded signal (a major run-length-decoded bit stream) while the others are used as minor run-length-decoded signals (minor run-length-decoded bit streams). Preferably, the most advanced one of the run-length-decoded signals is used as the major run-length-decoded signal. The BIS detector 2615 tunes in timing to the major run-length-decoded signal. The BIS detector 2615 extracts time segments from the run-length-decoded signals which are in BIS positions, that is, prescribed places corresponding to the locations where BIS components of the major run-length-decoded signal (the most advanced run-length-decoded signal) are embedded. Therefore, in the absence of a bit slip from the output signal of the viterbi decoder 25, the timing of the signal extraction by the BIS detector 2615 exactly matches with the BIS positions in the major run-length-decoded signal, and is out of exact coincidence with those in the minor run-length-decoded signals. Normally, the BIS detector 2615 accurately extracts the BIS components from the major run-length-decoded signal while extracting the same-timing signal components from the minor run-length-decoded signals. The BIS detector 2615 stores the extracted BIS components and the extracted signal components into the memory 2616. Normally, the extracted signal components contain not only BIS components but also other components since the timing of the signal extraction by the BIS detector 2615 is out of exact coincidence with the BIS positions in the minor run-length-decoded signals. Thus, the BIS detector 2615 inaccurately extracts the BIS components from the minor run-length-decoded signals. The extracted signal components are referred to as the BIS-based components. A read address for the memory 2616 is controlled by a suitable device (not shown), and thereby a plurality of AFC signals being code words inclusive of ECC parity signals are read out from the memory 2616. The read-out AFC signals are fed to the AFC decoders 262(1), 262(2), . . . , and 262(N), respectively. The AFC signals originate from the run-length-decoded signals, respectively.

With reference back to FIG. 3, the AFC decoders 262(1), 262(2), . . . , and 262(N) subject the AFC signals to Reed-Solomon decoding which includes error correction responsive to the ECC parity signals in the AFC signals. In the case where each of the AFC decoders 262(1), 262(2), . . . , and 262(N) detects an error or errors in the related AFC signal during the error correction, the AFC decoder outputs an error signal representing the number of errors. Otherwise, each of the AFC decoders 262(1), 262(2), . . . , and 262(N) outputs a non-error signal rather than an error signal. The non-error signal represents the absence of an error.

Normally, the AFC signal corresponding to the major run-length-decoded signal is basically free from an error since the timing of the signal extraction by the BIS detector 2615 exactly matches with the BIS positions in the major run-length-decoded signal and hence the BIS detector 2615 accurately extracts the BIS components therefrom. Therefore, one of the AFC decoders 262(1), 262(2), . . . , and 262(N) which corresponds to the major run-length-decoded signal usually outputs a non-error signal rather than an error signal. On the other hand, each of the AFC signals corresponding to the minor run-length-decoded signals has errors since the timing of the signal extraction by the BIS detector 2615 is out of exact coincidence with the BIS positions in the minor run-length-decoded signals and hence the BIS detector 2615 inaccurately extracts the BIS components therefrom. Therefore, ones of the AFC decoders 262(1), 262(2), . . . , and 262(N) which correspond to the minor run-length-decoded signals output error signals.

A bit slip in the output signal of the viterbi decoder 25 causes the timing of the signal extraction by the BIS detector 2615 to move out of exact coincidence with the BIS positions in the major run-length-decoded signal. The bit slip causes the timing of the signal extraction by the BIS detector 2615 to relatively move into exact coincidence with the BIS positions in one of the minor run-length-decoded signals. Thus, in the event that the output signal of the viterbi decoder 25 has a bit slip, the BIS detector 2615 in the AFC detector 261 fails to accurately extract the BIS components from the major run-length-decoded signal so that one of the AFC decoders 262(1), 262(2), . . . , and 262(N) which corresponds to the major run-length-decoded signal outputs an error signal rather than a non-error signal. On the other hand, one of the AFC decoders 262(1), 262(2), . . . , and 262(N) which corresponds to the minor run-length-decoded signal in timing harmony with the signal extraction by the BIS detector 2615 outputs a non-error signal rather than an error signal. For every BIS-based error correction, the error numbers represented by the error-related signals outputted from the AFC decoders 262(1), 262(2), . . . , and 262(N) vary from each other. The variation in the error numbers indicates an error occurrence position related to the bit slip, that is, a position at which the bit slip occurs.

The comparator 263 receives the error-related signals from the AFC decoders 262(1), 262(2), . . . , and 262(N). Each of the error-related signals is either an error signal or a non-error signal. The error-related signals correspond to the non-delayed and delayed information bit streams used or generated in the AFC detector 261, respectively. In addition, the error-related signals correspond to the information bit streams applied to the selector 265 from the delay devices 264(1), 264(2), . . . , and 264(N), respectively. Thus, the information bit streams applied to the selector 265 from the delay devices 264(1), 264(2), . . . , and 264(N) correspond to the non-delayed and delayed information bit streams used or generated in the AFC detector 261, respectively. For every BIS-based error correction, the device 263 compares the error numbers represented by the error-related signals to decide the smallest one among the error numbers. The decided smallest error number is equal to 0 or more. The comparator 263 identifies one among the error-related signals which represents the decided smallest error number. The comparator 263 recognizes one among the information bit streams applied to the selector 265, which corresponds to the identified error-related signal, as the likeliest information bit stream. For every BIS-based error correction, the comparator 263 detects a variation in the error numbers represented by the error-related signals. The comparator 263 decides a bit-slip occurrence position (timing) or a bit slip quantity on the basis of the detected variation in the error numbers. The comparator 263 generates a choice information signal in response to the identified error-related signal and the decided bit-slip occurrence position (or the decided bit slip quantity). The comparator 263 outputs the generated choice information signal to the selector 265.

In the absence of a bit slip from the output signal of the viterbi decoder 25, the choice information signal generated by the comparator 263 allows the selector 265 to select the most advanced one among the information bit streams fed from the delay devices 264(1), 264(2), . . . , and 264(N) as the likeliest information bit stream. On the other hand, in the presence of a 3-bit slip, the choice information signal allows the selector 265 to select one among the information bit streams, which retards from the most advanced information bit stream by 3 bits, as the likeliest information bit stream.

In the event that a bit slip occurs in the output signal of the viterbi decoder 25, the bit slip propagates to the BIS detector 2615 at different timings while being carried by each of the run-length-decoded signals outputted from the run length decoder 2614. Before the bit slip propagates to the BIS detector 2615 for the first time, the BIS detector 2615 accurately extracts the BIS components from the major run-length-decoded signal, that is, the most advanced one of the run-lengthdecoded signals. Therefore, before the propagation of the bit slip to the BIS detector 2615, the BIS components extracted from the major run-length-decoded signal (the most advanced run-length-decoded signal) are free from an error or have only a small number of errors. The bit slip moves the subsequent BIS components of the major run-length-decoded signal from their normal positions recognized by the BIS detector 2615. Accordingly, after the propagation of the bit slip to the BIS detector 2615, the BIS detector 2615 fails to accurately extract the BIS components from the major run-length-decoded signal. As a result, there occurs an abrupt increase in the number of errors in the signal components extracted from the major run-length-decoded signal. On the other hand, the bit slip moves the subsequent BIS components of the minor run-length-decoded signal, which retards from the major run-length-decoded signal (the most advanced run-length-decoded signal) by a time interval corresponding to the quantity of the bit slip, to the normal positions recognized by the BIS detector 2615. Accordingly, after the propagation of the bit slip to the BIS detector 2615, the BIS detector 2615 accurately extracts the BIS components from that minor run-length-decoded signal. As a result, there occurs an abrupt decrease in the number of errors in the signal components extracted from that minor run-length-decoded signal. Therefore, the bit-slip occurrence position or the bit slip quantity can be decided by detecting an abrupt decrease in one of the numbers of errors in the BIS-based components extracted from the minor run-length-decoded signals, and then detecting which of the minor run-length-decoded signals relates to the abrupt decrease in the error number.

As previously mentioned, the comparator 263 outputs the choice information signal to the selector 265. The major and minor run-length-decoded signals are sent from the AFC detector 261 to the selector 265 via the delay devices 264(1), 264(2), ..., and 264(N). The major and minor run-length-decoded signals applied to the selector 265 are different in timing by 1-bit-corresponding intervals. The device 265 selects one from the major and minor run-length-decoded signals, which corresponds to the decided smallest error number, as the likeliest run-length-decoded signal in response to the choice information signal while using the system clock signal as a reference timing signal. The selector 265 outputs the selected information bit stream to the ECC circuit 27 as the second decoding-resultant signal.

Before a bit slip occurs, the device 265 selects and outputs the major run-length-decoded signal (the most advanced run-length-decoded signal) as the likeliest run-length-decoded signal. When a bit slip occurs, the device 265 selects and outputs one of the minor run-length-coded signals which corresponds to the newly decided smallest error number or the quantity of the bit slip as the likeliest run-length-decoded signal. Thus, upon the occurrence of a bit slip at a time position between sync signals, the selector 265 changes the selected likeliest run-length-decoded signal from the major run-length-decoded signal to a minor run-length-coded information bit stream which corresponds to the newly decided smallest error number or the quantity of the bit slip.

The ECC circuit 27 subjects the run-length-decoded signal (the second decoding-resultant signal) selected by the selector 265 to error correction responsive to parity signals contained therein, thereby recovering original digital information. The parity signals include, for example, RS code signals and LDPC signals. The ECC circuit 27 outputs the recovered digital information.

Figure 7:
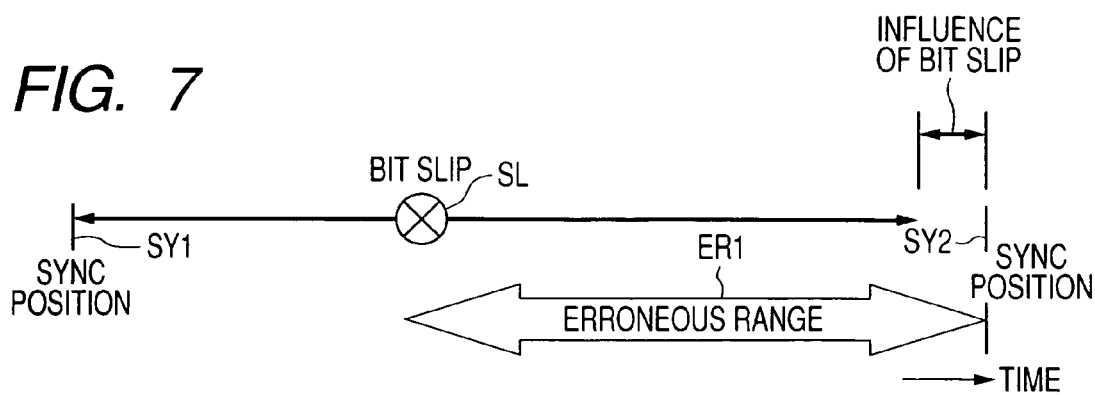
FIG. 7 is a time-domain diagram of an example of sync positions, a bit-slip occurrence position, and an erroneous range occurring in a prior-art system.

FIG. 7 shows prior-art conditions where a sync signal SY1 is reproduced and then a bit slip occurs at a time position SL, and bits after the bit slip are out of normal positions. According to a prior-art technology, all bits between the bit slip and a next sync signal SY2 are out of normal positions, and constitute an erroneous range ER1.

Figure 8:
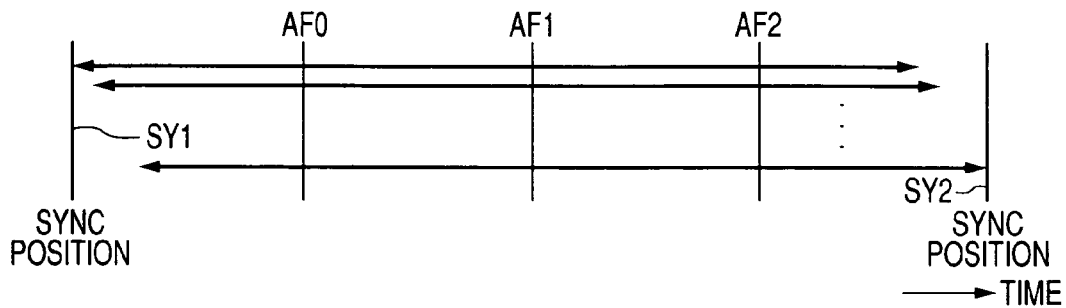
FIG. 8 is a time-domain diagram of one sync blocks of run-length-decoded signals different in timing by 1-bit-corresponding intervals, and BIS positions therein.

With reference to FIG. 8, there are run-length-decoded signals different in timing by 1-bit-corresponding intervals. Data AF in address fields of the run-length-decoded signals are detected. In FIG. 8, the horizontal lines with the arrows denote one sync blocks of the run-length-decoded signals, respectively. The characters AF0, AF1, and AF2 denote the timings of BIS components, that is, the BIS positions.

Figure 9:
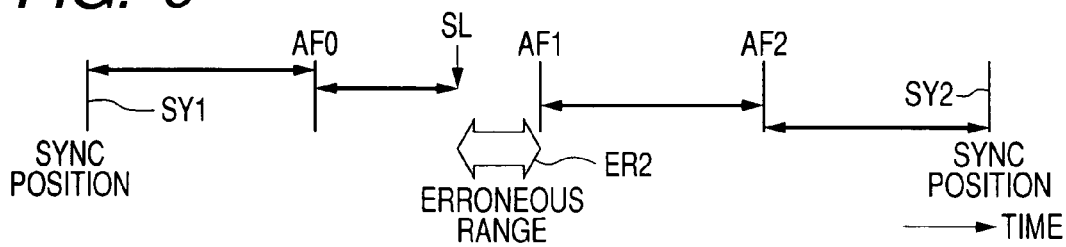
FIG. 9 is a time-domain diagram of an example of sync positions, a bit-slip occurrence position, and an erroneous range occurring in the recording and reproducing apparatus in the first embodiment of this invention.

FIG. 9 shows conditions occurring in the first embodiment of this invention. With reference to FIG. 9, a sync signal SY1 is reproduced and then a bit slip occurs at a time position SL between the timings AF0 and AF1 of BIS components. An erroneous range ER2 starts from the bit-slip occurrence position SL. At the timing AF1 of BIS components after the bit-slip occurrence position SL, the likeliest run-length-decoded signal selected by the selector 265 changes from the major run-length-decoded signal (the most advanced run-length-decoded signal) to a minor run-length-decoded signal which corresponds to the newly decided smallest error number or the quantity of the bit slip. Therefore, it is possible to terminate the erroneous range ER2 at the timing AF1 of BIS components. The selector 265 continues to select and output that minor run-length-decoded signal until a next sync signal SY2 is reproduced. The erroneous range ER2 is narrower than the prior-art erroneous range ER 1 by the interval between the BIS timing AF1 and the next sync signal SY2.

Figure 10:
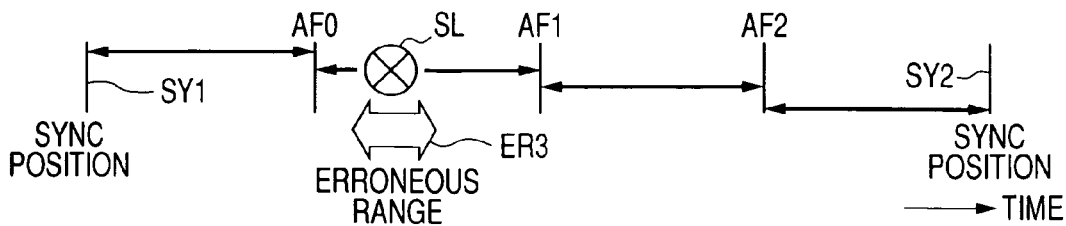
FIG. 10 is a time-domain diagram of an example of sync positions, a bit-slip occurrence position, and an erroneous range occurring in a modification of the recording and reproducing apparatus in the first embodiment of this invention.

According to a first modification of the first embodiment of this invention, the timing correction circuit 26 is designed to implement a going-back procedure as follows. The timing correction circuit 26 decides bit positions after a bit-slip occurrence position while using a BIS timing subsequent to the bit-slip occurrence position as a reference. The timing correction circuit 26 selects one from the minor run-length-decoded signals, which corresponds to the newly decided smallest error number or the quantity of the bit slip, for the decided bit positions between the bit-slip occurrence position and the BIS timing. The timing correction circuit 26 outputs the selected minor run-length-decoded signal. In other words, the timing correction circuit 26 decides a bit position immediately after a bit-slip occurrence position while using a BIS timing subsequent to the bit-slip occurrence position as a reference. The timing correction circuit 26 changes the selected and outputted run-length-decoded signal from the normal one to a minor one at a timing equal to the decided bit position immediately after the bit-slip occurrence position. In this case, as shown in FIG. 10, there occurs an erroneous range ER3 remarkably narrower than the prior-art erroneous range ER1.

As previously mentioned, the first embodiment of this invention generates a plurality of run-length decoded bit streams different in timing by 1-bit-corresponding intervals. The first embodiment of this invention utilizes BIS signals embedded in predetermined positions within every sync block of each of the run-length-decoded bit streams. At every BIS-signal timing, the degree of correctness of data AF in BIS is decided for each of the run-length-decoded bit streams. Then, the first embodiment of this invention selects one from the run-length-decoded bit streams which corresponds to the highest correctness degree. Therefore, it is possible to remarkably reduce the error rate.

In the first modification of the first embodiment of this invention, bit positions after a bit-slip occurrence position are decided while a BIS timing subsequent to the bit-slip occurrence position is used as a reference. One of the minor run-length-decoded signals which corresponds to the newly decided smallest error number or the quantity of the bit slip is selected for the decided bit positions between the bit-slip occurrence position and the BIS timing. In other words, a bit position immediately after a bit-slip occurrence position is decided while a BIS timing subsequent to the bit-slip occurrence position is used as a reference. The selected run-length-decoded signal is changed from the normal one to a minor one at a timing equal to the decided bit position immediately after the bit-slip occurrence position. Therefore, it is possible to remarkably reduce the error rate.

According to a second modification of the first embodiment of this invention, the numbers of errors which are detected at BIS timings are accumulated or summed up for every term between sync signals. The fewest one among the accumulated error numbers is decided. One of the run-length-decoded signals which corresponds to the fewest accumulated error number continues to be selected and outputted as the likeliest information bit stream during every term between sync signals. Therefore, in the case where a bit slip occurs immediately before a next sync signal, the most advanced run-length-decoded signal (the major run-length-decoded signal or the major information bit stream) is selected and outputted as the likeliest information bit stream. In the case where a bit slip occurs immediately after a sync signal, the minor run-length-decoded signal which retards from the major one by a time interval corresponding to the quantity of the bit slip is selected and outputted as the likeliest information bit stream. Thus, in this case, it is possible to restrain the error rate to a small value.

It should be noted that the recording side in FIG. 1 and the reproducing side in FIG. 2 may be provided in a recording apparatus and a reproducing apparatus respectively.

SECOND EMBODIMENT

The recording side of a recording and reproducing apparatus in a second embodiment of this invention is the same as that in the first embodiment of this invention.

Figure 11:
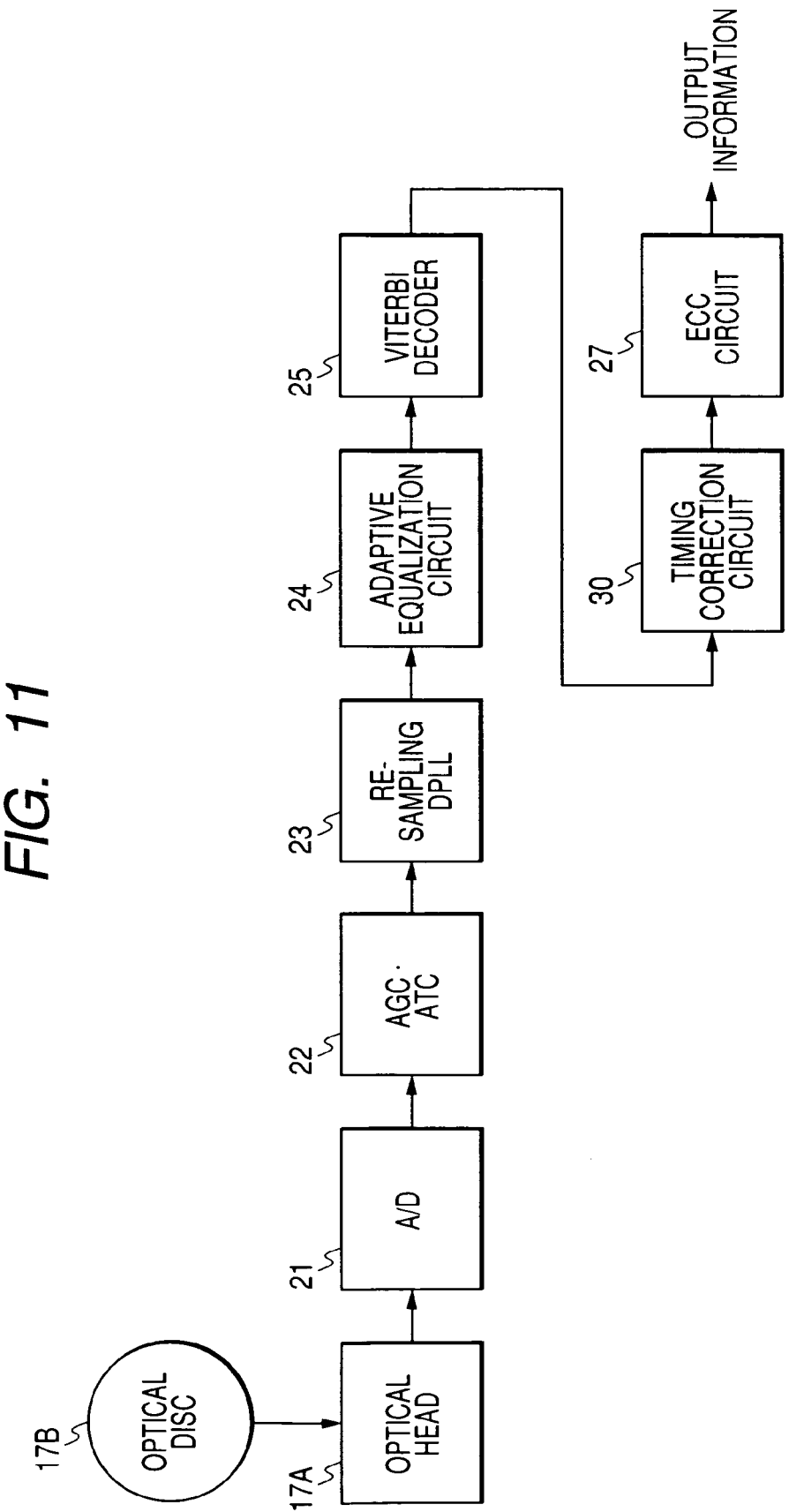
FIG. 11 is a block diagram of the reproducing side of a recording and reproducing apparatus in a second embodiment of this invention.

FIG. 11 shows the reproducing side of the apparatus in the second embodiment of this invention. The reproducing side of the apparatus in FIG. 11 is similar to that in FIG. 2 except that a timing correction circuit 30 replaces the timing correction circuit 26 (see FIG. 2).

The timing correction circuit 30 receives the viterbi-decoded signal (the output signal of the viterbi decoder 25). The timing correction circuit 30 subjects the viterbi-decoded signal to run length decoding and timing correction. The timing correction circuit 30 outputs the resultant signal to the ECC circuit 27 as a second decoding-resultant signal.

The timing correction circuit 30 is designed to retrieve correct bit positions even in the case where a bit slip occurs so that on-signal bit positions are shifted from normal ones. The timing correction circuit 30 estimates the locally likeliest one among information bit streams on the basis of decoding errors in the viterbi decoding. The timing correction circuit 30 utilizes the fact that a bit position shift causes increased numbers of unnatural code words and unnatural state transitions to occur in a reproduced signal subjected to the run length decoding. The timing correction circuit 30 measures every interval between sync signals on the basis of asynchronous clock information, and decides likely bit positions in accordance with the measured inter-sync interval. Then, the timing correction circuit 30 utilizes the decided likely bit positions for timing correction. In addition, the timing correction circuit 30 utilizes the fact that time positions can easily be identified since the re-sampling DPLL 23 already implements signal sampling in response to the asynchronous bit clock signal. Thereby, the timing correction circuit 30 retrieves likely bit positions even in a reproduced signal portion from which sync signals are absent.

Figure 12:
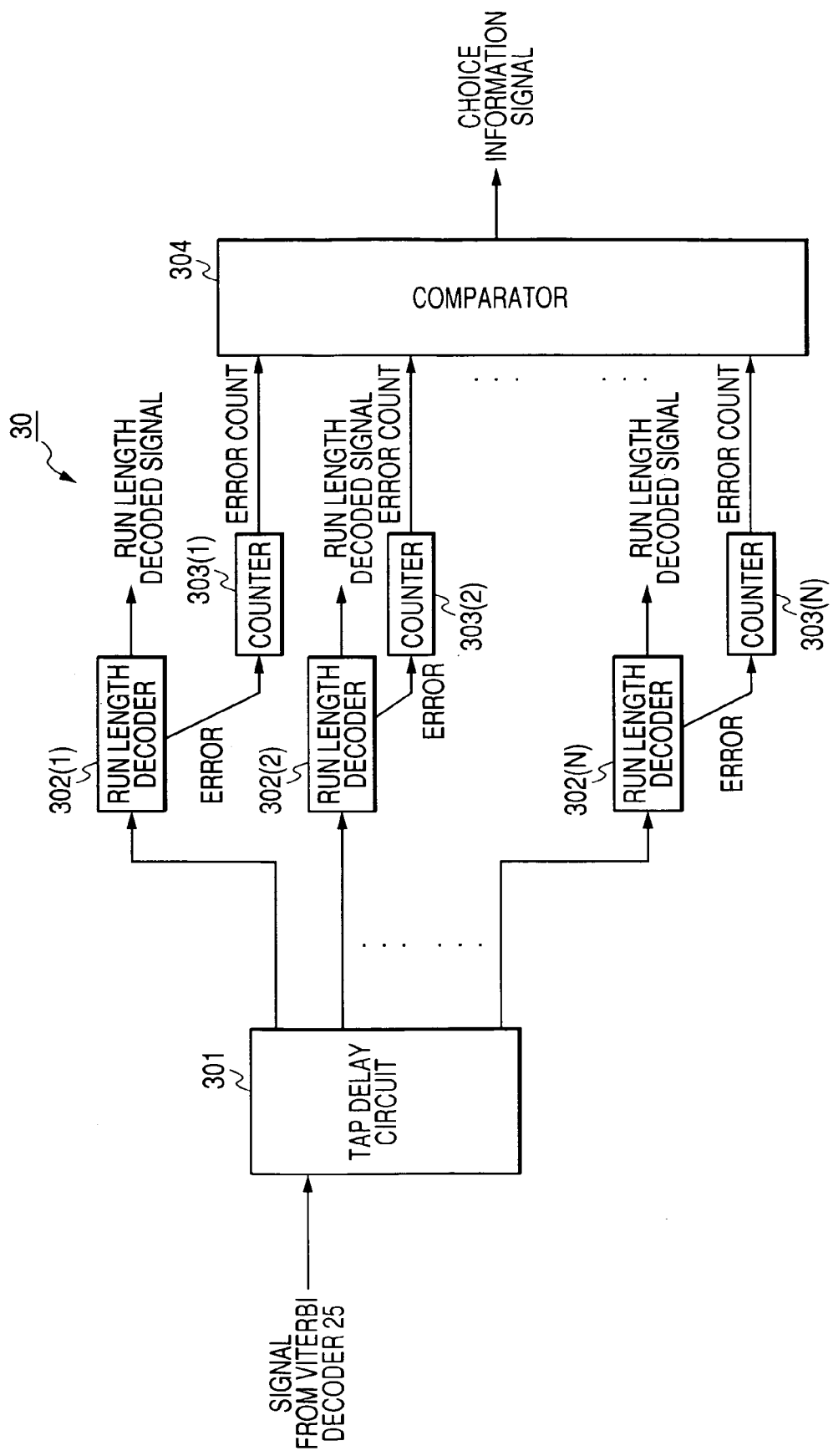
FIG. 12 is a block diagram of a first portion of a timing correction circuit in FIG. 11.
Figure 13:
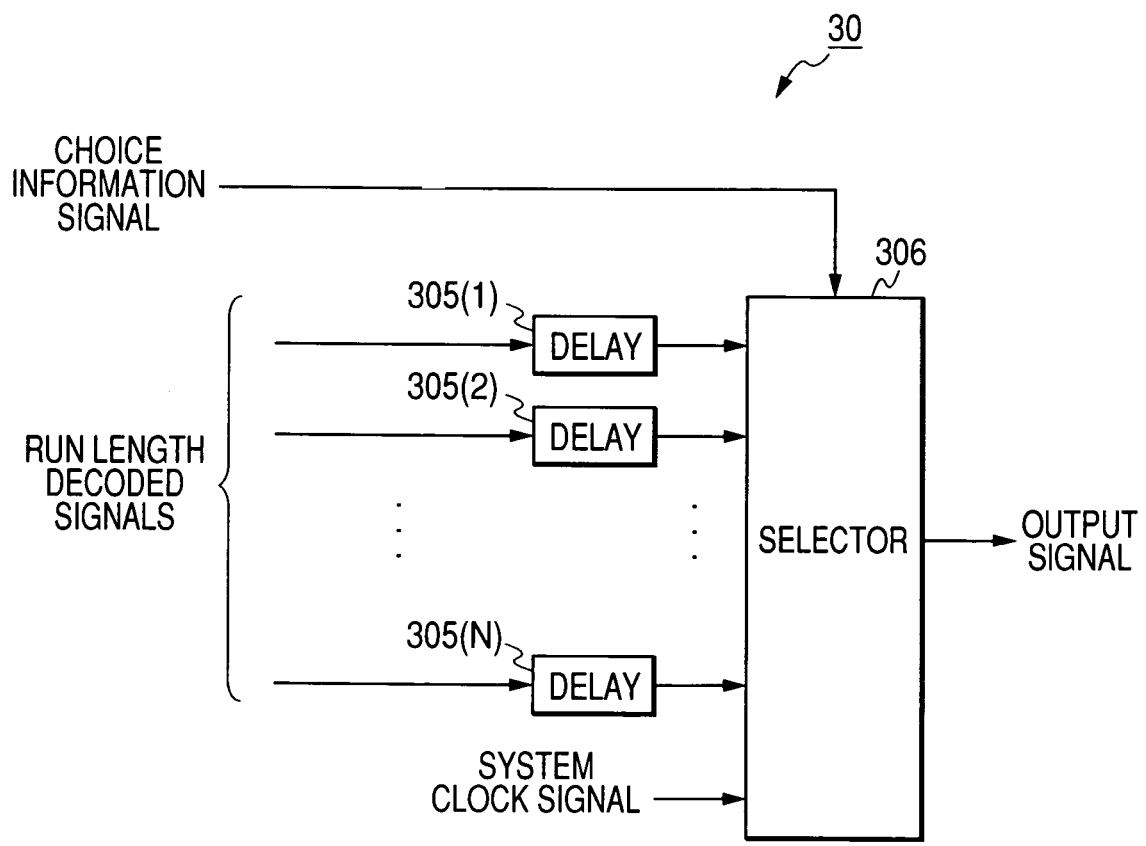
FIG. 13 is a block diagram of a second portion of the timing correction circuit in FIG. 11.

As shown in FIGS. 12 and 13, the timing correction circuit 30 includes a tap delay circuit 301, run length decoders 302(1), 302(2), ..., and 302(N), counters 303(1), 303(2), ..., and 303(N), a comparator 304, delay devices 305(1), 305(2), ..., and 305(N), and a selector 306.

The tap delay circuit 301 receives the first decoding-resultant signal (that is, the viterbi-decoded signal) from the viterbi decoder 25. The tap delay circuit 301 non-delays and delays the viterbi-decoded signal by prescribed different lengths of time to get a plurality of information bit streams which relate to respective timings spaced at 1-bit-corresponding intervals. The number of the information bit streams is equal to a predetermined integer N (for example, 3 or more). The tap delay circuit 301 outputs the information bit streams to the run length decoders 302(1), 302(2), ..., and 302(N) respectively.

The run length decoders 302(1), 302(2), ..., and 302(N) subject the information bit streams to run length decoding to get run-length-decoded signals (run-length-decoded bit streams), respectively. The run length decoders 302(1), 302(2), ..., and 302(N) output the run-length-decoded signals to the delay devices 305(1), 305(2), ..., and 305(N), respectively. The run length decoders 302(1), 302(2), ..., and 302(N) serve to detect decoding errors. The run length decoders 302(1), 302(2), ..., and 302(N) generate error signals when detecting decoding errors. The run length decoders 302(1), 302(2), ..., and 302(N) output the generated error signals to the counters 303(1), 303(2), ..., and 303(N), respectively.

The devices 303(1), 303(2), ..., and 303(N) count error signals from the run length decoders 302(1), 302(2), ..., and 302(N), and generates signals representing the error count values, respectively. The counters 303(1), 303(2), ..., and 303(N) output the respective error-count-value signals to the comparator 304.

The device 304 compares the error count values represented by the output signals of the counters 303(1), 303(2), ..., and 303(N) to decide the smallest one among the error count values. The comparator 304 detects which of the run-length-decoded signals corresponds to the decided smallest error count value. The comparator 304 generates a choice information signal in accordance with which of the run-length-decoded signals corresponds to the decided smallest error count value. The comparator 304 outputs the generated choice information signal to the selector 306.

The delay devices 305(1), 305(2), ..., and 305(N) receive the run-length-decoded signals from the run length decoders 302(1), 302(2), ..., and 302(N), respectively. The delay devices 305(1), 305(2), ..., and 305(N) delay the run-length-decoded signals by a prescribed time interval to get delayed information bit streams, respectively. The delay devices 305(1), 305(2), ..., and 305(N) output the delayed information bit streams to the selector 306. The delayed information bit streams are different in timing by 1-bit-corresponding intervals.

The selector 306 receives the system clock signal from the suitable device (not shown). The device 306 selects the likeliest one from the delayed information bit streams in response to the choice information signal while using the system clock signal as a reference timing signal. The selector 306 outputs the selected information bit stream to the ECC circuit 27 as the second decoding-resultant signal. The signal delay provided by the delay devices 305(1), 305(2), ..., and 305(N) is chosen to harmonize the timings of the delayed information bit streams with the timing of the choice information signal.

The number of the run length decoders 302(1), 302(2), ..., and 302(N) is equal to the number of the information bit streams outputted from the tap delay circuit 301. Since the information bit streams result from signal shifts different by 1-bit-corresponding intervals, the number of the information bit streams corresponds to a bit shift quantity. The number of the run length decoders 302(1), 302(2), ..., and 302(N) also corresponds to the bit shift quantity. To detect a bit slip, it is necessary to generate different-timing information bit streams whose number corresponds to at least the quantity of the bit slip. Therefore, it is preferable to provide run length decoders whose number corresponds to an estimated bit slip quantity or more. Only run length decoders whose number corresponds to less than the estimated bit slip quantity may be provided. In this case, at least one of the run length decoders is used twice.

It should be noted that the comparator 304, the selector 306, and others constitute a comparing and selecting means of this invention.

Figure 14:
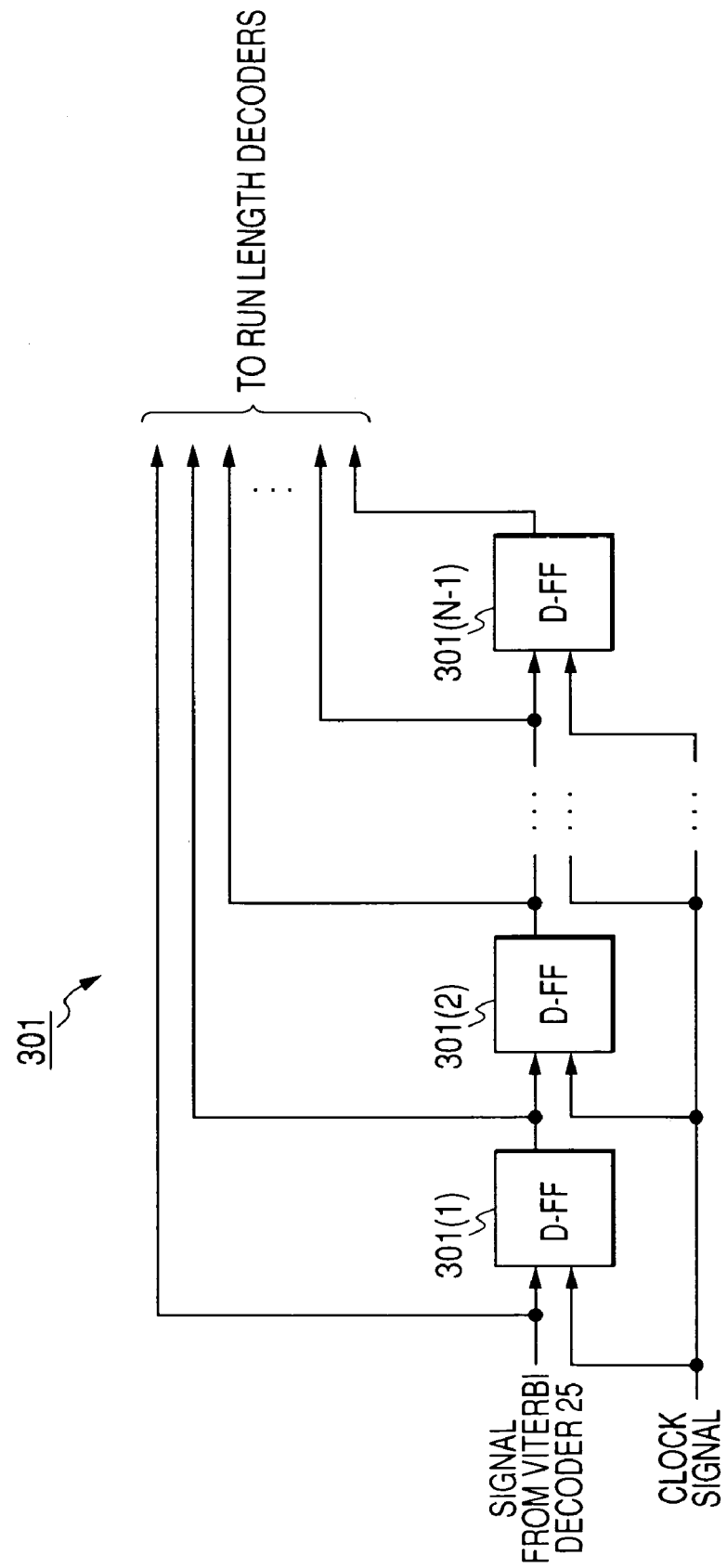
FIG. 14 is a block diagram of a tap delay circuit in FIG. 12.

As shown in FIG. 14, the tap delay circuit 301 includes D flip-flops (D-FF) 301(1), 301(2), ..., and 301(N−1) connected in cascade to form a delay line. Each of the D flip-flops 301(1), 301(2), ..., and 301(N−1) provides a signal delay corresponding to one bit while being driven by a clock signal (for example, the system clock signal) fed from a suitable device (not shown). The output signal of the viterbi decoder 25 bypasses the delay line before reaching the run length decoder 302(1) as a non-delayed information bit stream. The output signal of the viterbi decoder 25 also propagates through the delay line while being delayed by the D flip-flops 301(1), 301(2), ..., and 301(N−1). Information bit streams which appear at the output sides of the D flip-flops D flip-flops 301(1), 301(2), ..., and 301(N−1) are delayed from the non-delayed information bit stream by time intervals corresponding to 1 bit, 2 bits, ..., and (N−1) bits respectively. The delayed information bit streams are applied to the run length decoders 302(2), 302(3), ..., and 302(N), respectively.

The run length decoders 302(1), 302(2), ..., and 302(N) subject the non-delayed and delayed information bit streams to run length decoding to generate respective run-length-decoded signals (run-length-decoded bit streams) which are different in timing by 1-bit-corresponding intervals. The run length decoding for one of the non-delayed and delayed information bit streams is independent of that for another. The run length decoders 302(1), 302(2), ..., and 302(N) output the run-length-decoded signals to the delay devices 305(1), 305(2), ..., and 305(N), respectively. The run length decoders 302(1), 302(2), ..., and 302(N) serve to detect decoding errors indicating the occurrences of unnatural code words or unnatural state transitions in the information bit streams subjected to the run length decoding. The run length decoders 302(1), 302(2), ..., and 302(N) generate error signals when detecting decoding errors. The run length decoders 302(1), 302(2), ..., and 302(N) output the generated error signals to the counters 303(1), 303(2), ..., and 303(N), respectively.

Each of the run length decoders 302(1), 302(2), ..., and 302(N) may be designed to operate as follows. The run length decoder obtains an error decision result during the run length decoding. The run length decoder calculates the difference between the error decision result and the related information bit stream outputted from the tap delay circuit 301 as an Euclidean distance. The run length decoder computes the square of the calculated Euclidean distance or the absolute value thereof. The run length decoder uses the computed square or absolute value as the error signal.

The devices 303(1), 303(2), ..., and 303(N) count the error signals for every bit or every prescribed number of bits, and accumulate or sum up the count results during every prescribed term to get the error count values respectively. The counters 303(1), 303(2), ..., and 303(N) generate signals representing the error count values respectively. The counters 303(1), 303(2), ..., and 303(N) output the respective error-count-value signals to the comparator 304. The error-count-value signals correspond to the run-length-decoded signals fed to the selector 306, respectively.

The device 304 compares the error count values represented by the output signals of the counters 303(1), 303(2), ..., and 303(N) to decide the smallest one among the error count values. The comparator 304 detects which of the run-length-decoded signals corresponds to the decided smallest error count value. The comparator 304 generates a choice information signal in accordance with which of the run-length-decoded signals corresponds to the decided smallest error count value. The comparator 304 outputs the generated choice information signal to the selector 306. The choice information signal is designed to allow the device 306 to select one from the run-length-decoded signals which corresponds to the decided smallest error count value.

The comparator 304 can estimate a bit-slip occurrence position (timing) from the error count values represented by the output signals of the counters 303(1), 303(2), ..., and 303(N). The resolution of the estimation of a bit-slip occurrence position corresponds to one bit or prescribed number of bits. The timing difference between the most advanced one of the run-length-decoded signals and the run-length-decoded signal corresponding to the newly decided smallest error count value can be used as an indication of a bit slip quantity.

The run-length-decoded signals propagate from the run length decoders 302(1), 302(2), ..., and 302(N) to the selector 306 through the delay devices 305(1), 305(2), ..., and 305(N), respectively. The devices 305(1), 305(2), ..., and 305(N) delay the run-length-decoded signals by a prescribed time interval to get delayed information bit streams, respectively. The delay devices 305(1), 305(2), ..., and 305(N) output the delayed information bit streams to the selector 306. The delayed information bit streams are different in timing by 1-bit-corresponding intervals.

The selector 306 receives the system clock signal from the suitable device (not shown). The device 306 selects one from the run-length-decoded signals, which corresponds to the decided smallest error count value, as the likeliest run-length-decoded signal in response to the choice information signal while using the system clock signal as a reference timing signal. The selector 306 outputs the selected information bit stream to the ECC circuit 27 as the second decoding-resultant signal. In the event that a bit slip occurs, one of the run-length-decoded signals which retards from the most advanced run-length-decoded signal by a time interval corresponding to the quantity of the bit slip is selected by and outputted from the selector 306 in response to the result of the comparison between the error count values.

The ECC circuit 27 subjects the second decoding-resultant signal (that is, the output signal of the selector 306 in the timing correction circuit 30) to error correction responsive to parity signals contained therein, thereby recovering original digital information. The parity signals include, for example, RS code signals and LDPC signals. The ECC circuit 27 outputs the recovered digital information.

In the case where the viterbi decoding by the viterbi decoder 25 is of the soft decision type, the viterbi decoder 25 outputs the likelihood information to the timing correction circuit 30 together with the viterbi-decoded signal. In the event that a bit slip occurs, a segment of the likelihood information which corresponds to the time position of the bit slip is set to an unlikely value (equal to "0"). Consequently, the likelihood information is consistent with the occurrence of a bit slip.

Figure 15:
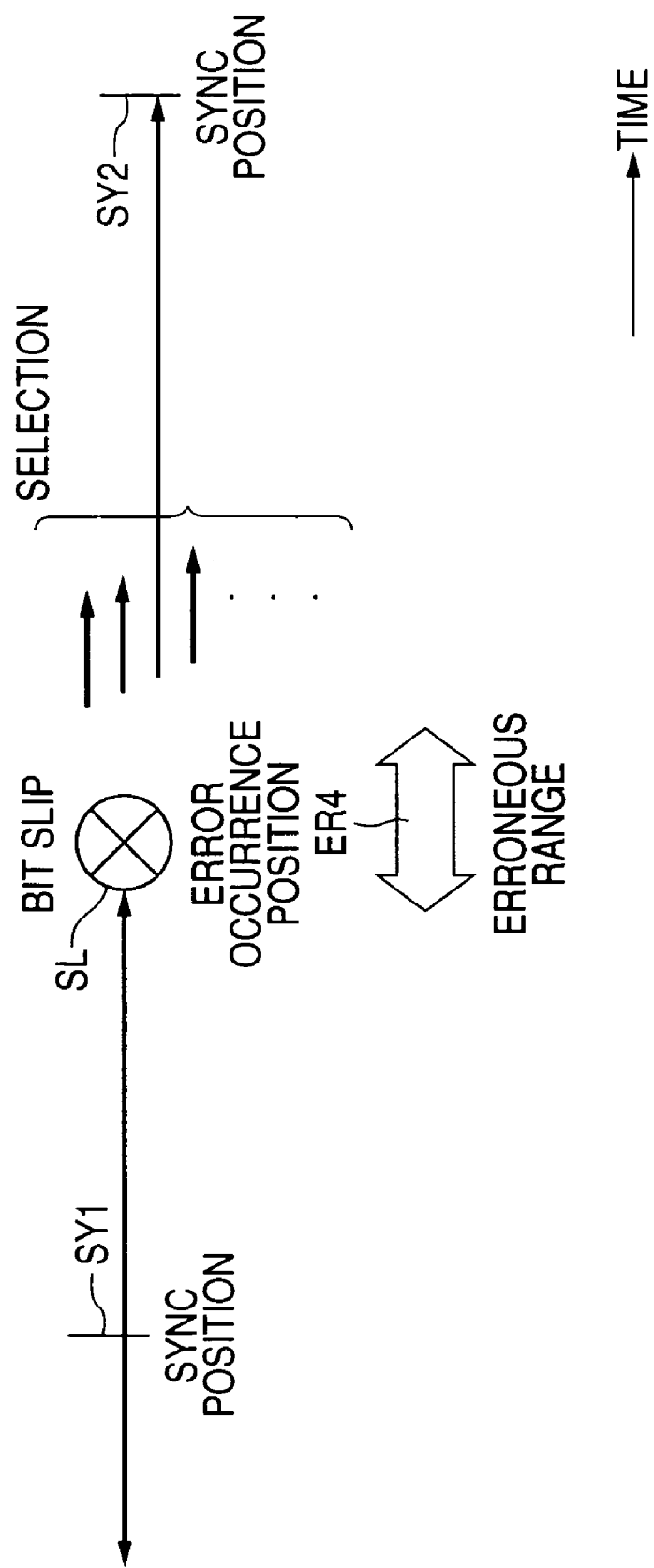
FIG. 15 is a time-domain diagram of an example of sync positions, a bit-slip occurrence position, and an erroneous range occurring in the recording and reproducing apparatus in the second embodiment of this invention.

FIG. 15 shows conditions occurring in the second embodiment of this invention. With reference to FIG. 15, there are run-length-decoded signals different in timing by 1-bit-corresponding intervals. A sync signal SY1 is reproduced, and then a bit slip occurs at a time position SL before a next sync signal SY2. An erroneous range ER4 starts from the bit-slip occurrence position SL. The bit slip causes decoding errors in the run length decoding. The starting position of occurrence of the decoding errors is detected. After the detected decoding-error occurrence position, one of the run-length-decoded signals which corresponds to the newly decided smallest error count value is selected as the likeliest information bit stream. This selection terminates the erroneous range ER4. Therefore, the erroneous range ER4 is remarkably narrower than the prior-art erroneous range ER1 (see FIG. 7).

Before a bit slip occurs, the most advanced run-length-decoded signal normally corresponds to the decided smallest error count value. Therefore, the most advanced run-length-decoded signal is selected. In the event that a bit slip occurs, the error count value relating to the most advanced run-length-decoded signal abruptly increases while the error count value relating to the run-length-decoded signal delayed from the most advanced one by a time interval corresponding to the quantity of the bit slip abruptly decreases. Thus, in this case, the run-length-decoded signal delayed from the most advanced one by a time interval corresponding to the quantity of the bit slip is selected instead of the most advanced one. The position of the occurrence of the bit slip can be estimated by detecting which of the error count values abruptly decreases.

In the absence of a bit slip, the choice information signal generated by the comparator 304 allows the selector 306 to select the most advanced run-length-decoded signal normally corresponding to the decided smallest error count value. On the other hand, in the presence of a 3-bit slip, the error count value relating to the run-length-decoded signal delayed from the most advanced one by 3 bits becomes the smallest so that the choice information signal allows the selector 306 to select that run-length-decoded signal.

As previously mentioned, the second embodiment of this invention generates a plurality of run-length-decoded signals different in timing by 1-bit-corresponding intervals. The decoding errors in the run length decoders 302(1), 302(2), . . . , and 302(N) are counted for every bit or every prescribed number of bits, and the count results are accumulated or summed up during every prescribed term to get error count values respectively. The smallest value among the error count values is decided. One of the run-length-coded signals which corresponds to the decided smallest error count value is selected and outputted as the likeliest information bit stream. Accordingly, in the event that a bit slip occurs at a time position between sync signals SY1 and SY2, one of the run-length-decoded signals which retards from the most advanced one by a time interval corresponding to the quantity of the bit slip is selected and outputted as the likeliest information bit stream. As a result, the erroneous range ER4 in FIG. 15 is remarkably narrower than the prior-art erroneous range ER1 (see FIG. 7).

Figure 16:
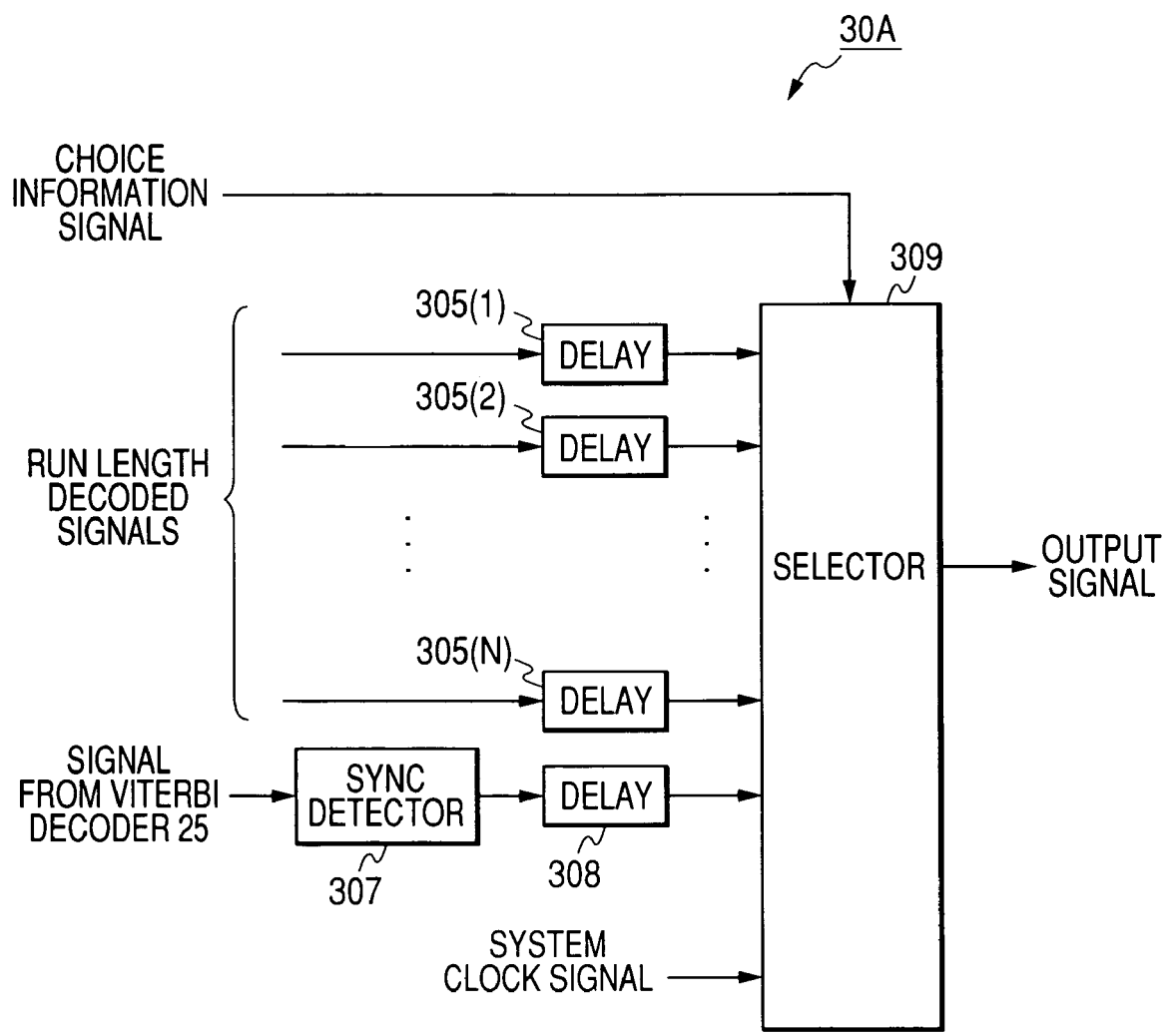
FIG. 16 is a block diagram of a portion of a timing correction circuit which can be used instead of that in FIGS. 11-13.

FIG. 16 shows a portion of a timing correction circuit 30A which may be used instead of the timing correction circuit 30. The timing correction circuit 30A is similar to the timing correction circuit 30 except for design changes as follows.

With reference to FIG. 16, the timing correction circuit 30A includes a selector 309 instead of the selector 306 (see FIG. 13). The timing correction circuit 30A further includes a sync detector 307 and a delay device 308.

The sync detector 307 receives the viterbi-decoded signal, that is, the output signal of the viterbi decoder 25 (see FIG. 11). The sync detector 307 senses every sync signal in the viterbi-decoded signal. The sync detector 307 outputs the sensed sync signal to the delay device 308. The delay device 308 delays the sync signal by a prescribed time interval to get a delayed sync signal. The delay device 308 outputs the delayed sync signal to the selector 309. The signal delay provided by the delay device 308 is chosen to harmonize the timing of the delayed sync signal with that of the choice information signal applied to the selector 309.

The selector 309 receives the run-length-decoded signals from the respective delay devices 305(1), 305(2), . . . , and 305(N). The device 309 selects one from the run-length-decoded signals which corresponds to the decided smallest error count value. The device 309 outputs the selected run-length-decoded signal as the likeliest information bit stream. The selector 309 decides correct bit positions in accordance with the sync signals fed from the delay device 308. The selector 309 implements the signal selection at a timing determined by one of the decided correct bit positions.

Specifically, the selector 309 decides correct bit positions after a bit-slip occurrence position in accordance with the choice information signal and the sync signals. For the decided correct bit positions after the bit-slip occurrence position, the device 309 selects and outputs one among the run-length-decoded signals which corresponds to the newly decided smallest error count value. In other words, the selector 309 decides a correct bit position immediately after a bit-slip occurrence position in accordance with the choice information signal and the sync signals. At a timing corresponding to the correct bit position immediately after the bit-slip occurrence position, the selector 309 changes the selected and outputted run-length-decoded signal from one to another.

Figure 17:
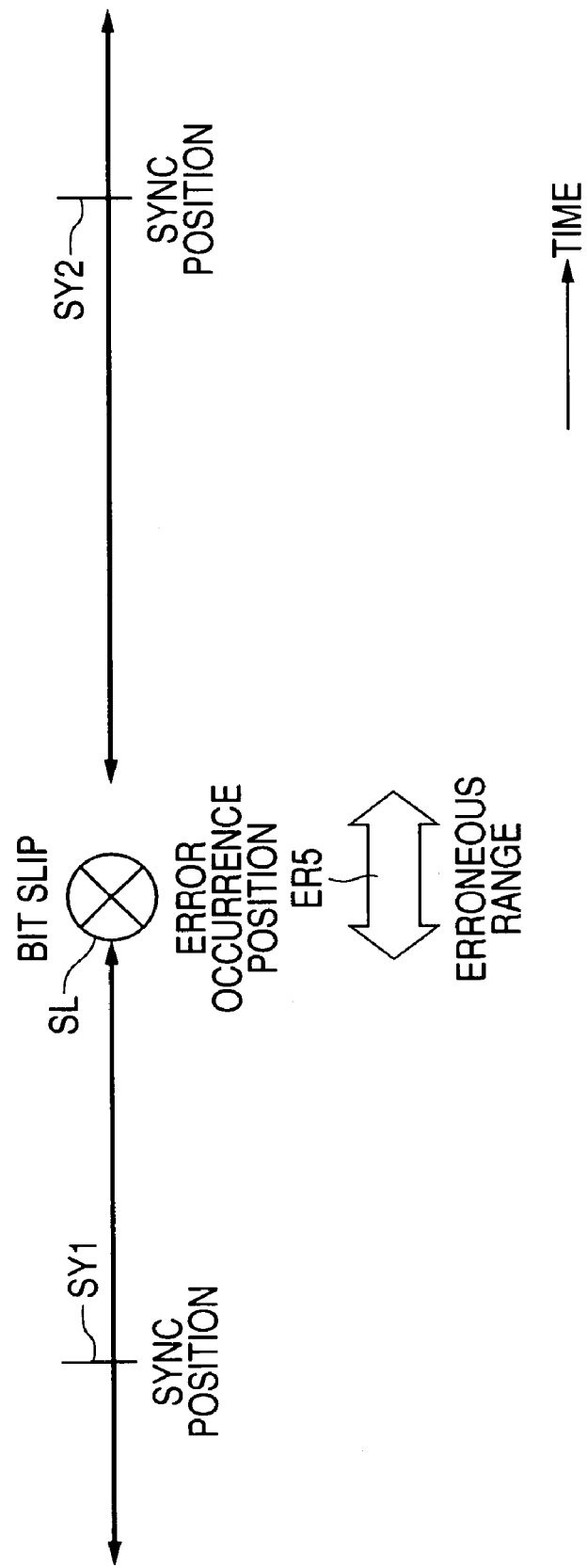
FIG. 17 is a time-domain diagram of an example of sync positions, a bit-slip occurrence position, and an erroneous range occurring in the second embodiment of this invention which uses the timing correction circuit in FIG. 16.

FIG. 17 shows conditions occurring in the second embodiment of this invention which uses the timing correction circuit 30A rather than the timing correction circuit 30. With reference to FIG. 17, a sync signal SY1 is reproduced, and then a bit slip occurs at a time position SL before a next sync signal SY2. An erroneous range ER5 starts from the bit-slip occurrence position SL. The selector 309 decides likely bit positions (correct bit positions) in accordance with the sync signals fed from the delay device 308. Likely bit positions before a sync signal are decided while the sync signal is used as an indication of a reference position. Counting pulses of a fixed-frequency clock signal (for example, the system clock signal) is used for the decision of the likely bit positions. The selector 309 decides likely bit positions after the bit-slip occurrence position SL while using the sync signal SY2 as a reference. The device 309 selects one from the run-length-decoded signals, which corresponds to the newly decided smallest error count value, for the decided likely bit positions between the bit-slip occurrence position SL and the sync signal SY2. The selector 309 outputs the selected run-length-decoded signal as the likeliest information bit stream. Thus, the selected run-length-decoded signal is changed from one to another as a result of the occurrence of the bit slip. The time position of the change of the selected run-length-decoded signal is equal to first one of the likely bit positions after the bit-slip occurrence position SL. In this case, the erroneous range ER5 is remarkably narrower than the prior-art erroneous range ER1 (see FIG. 7).

According to a first modification of the second embodiment of this invention, the magnitude of a PLL error in the re-sampling DPLL 23 continues to be monitored. Every time point at which the PLL error magnitude peaks is detected. The detected time point is used as an estimated bit-slip occurrence position. A going-back procedure starting from the position of a sync signal after the estimated bit-slip occurrence position is implemented, and one of the run-length-decoded signals which corresponds to the newly decided smallest error count value is selected and outputted at the estimated bit-slip occurrence position.

According to a second modification of the second embodiment of this invention, the numbers of errors are accumulated or summed up for every term between sync signals. The fewest one among the accumulated error numbers is decided. One of the run-length-decoded signals which corresponds to the fewest accumulated error number continues to be selected and outputted as the likeliest information bit stream during every term between sync signals. Therefore, in the case where a bit slip occurs immediately before a next sync signal, the most advanced run-length-decoded signal is selected and outputted as the likeliest information bit stream. In the case where a bit slip occurs immediately after a sync signal, the run-length-decoded signal which retards from the most advanced one by a time interval corresponding to the quantity of the bit slip is selected and outputted as the likeliest information bit stream. Thus, in this case, it is possible to restrain the error rate to a small value.

The selector 306 may include a memory for storing the run-length-decoded signals outputted from the delay devices 305(1), 305(2), . . . , and 305(N) or the run length decoders 302(1), 302(2), . . . , and 302(N). In this case, the selector 306 estimates likely bit positions after the occurrence of a bit slip on the basis of the choice information signal. The memory is accessed in response to the choice information signal and the estimated likely bit positions so that the run-length-decoded signal designated by the choice information signal will be read out from the memory as a selected information bit stream during a term starting from first one of the estimated likely bit positions.

The selector 309 may include a memory for storing the run-length-decoded signals outputted from the delay devices 305(1), 305(2), . . . , and 305(N) or the run length decoders 302(1), 302(2), . . . , and 302(N). In this case, the selector 309 estimates likely bit positions after the occurrence of a bit slip on the basis of the choice information signal and the sync signals outputted from the delay device 308 or the sync detector 307. The memory is accessed in response to the choice information signal and the estimated likely bit positions so that the run-length-decoded signal designated by the choice information signal will be read out from the memory as a selected information bit stream during a term starting from first one of the estimated likely bit positions.

It should be noted that the recording side in FIG. 1 and the reproducing side in FIG. 11 may be provided in a recording apparatus and a reproducing apparatus respectively.

THIRD EMBODIMENT

Figure 18:
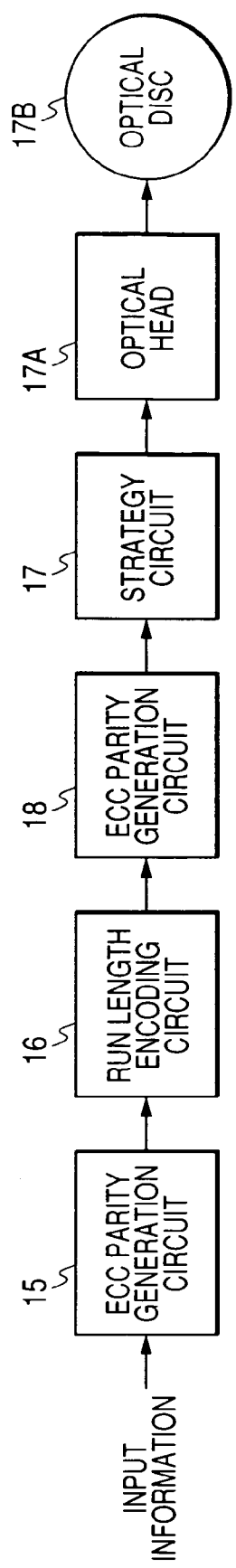
FIG. 18 is a block diagram of the recording side of a recording and reproducing apparatus in a third embodiment of this invention.

FIG. 18 shows the recording side of a recording and reproducing apparatus in a third embodiment of this invention. The recording side in FIG. 18 is similar to that in FIG. 1 except that an ECC parity generation circuit 18 is interposed between the run length encoding circuit 16 and the strategy circuit 17.

The ECC parity generation circuit 18 receives the sequence of words of the run length limited code from the run length encoding circuit 16. The ECC parity generation circuit 18 produces parity signals (ECC parity signals) in response to the sequence of words of the run length limited code. The parity signals include, for example, RS code signals and LDPC signals. The ECC parity generation circuit 18 adds the parity signals (the ECC parity signals) to the sequence of words of the run length limited code to get a parity-added sequence of words of the run length limited code. The ECC parity generation circuit 18 outputs the parity-added sequence of words of the run length limited code to the strategy circuit 17.

Figure 19:
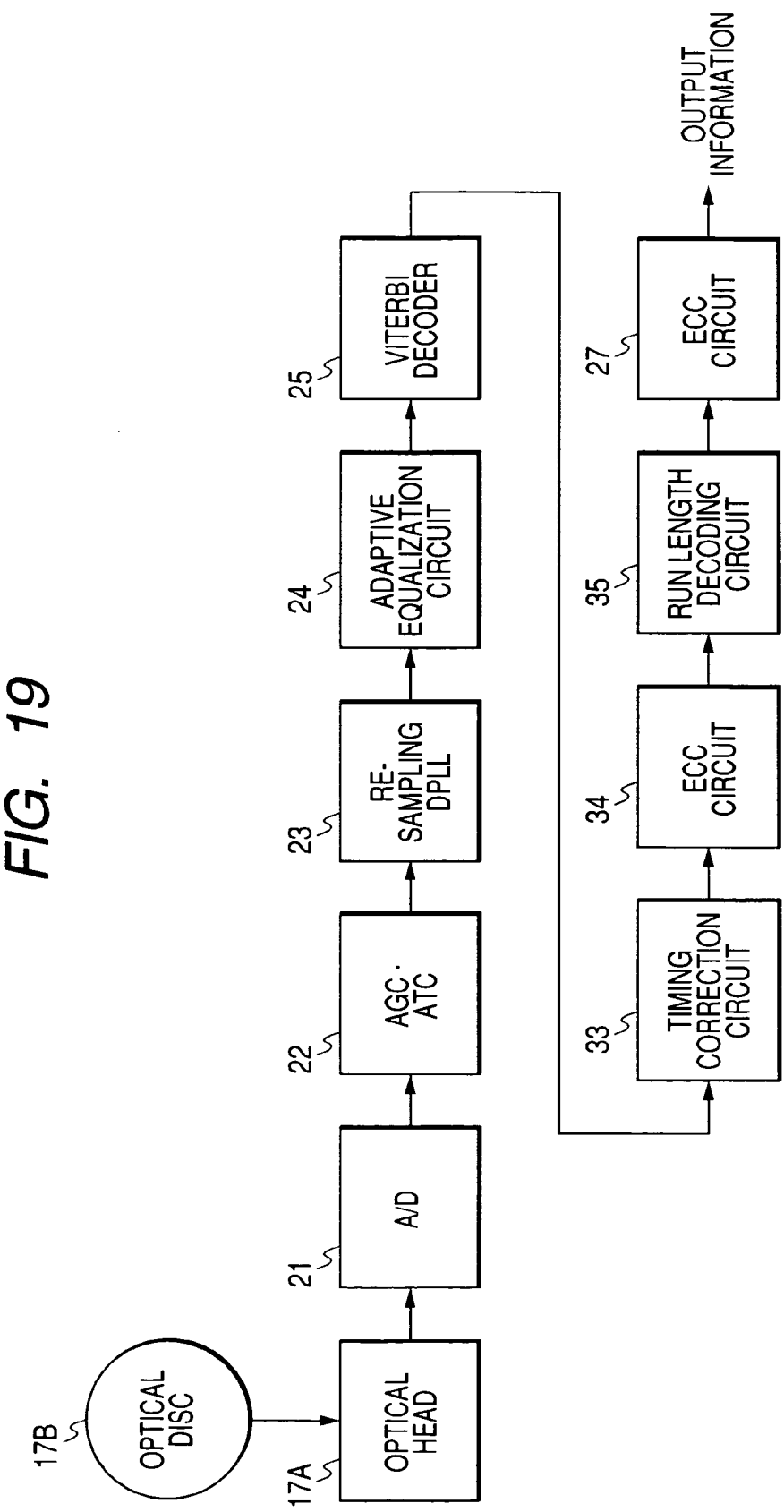
FIG. 19 is a block diagram of the reproducing side of the recording and reproducing apparatus in the third embodiment of this invention.

FIG. 19 shows the reproducing side of the apparatus in the third embodiment of this invention. The reproducing side in FIG. 19 is similar to that in FIG. 2 except for the following points.

The reproducing side in FIG. 19 includes a timing correction circuit 33, an ECC circuit 34, and a run length decoding circuit 35 which are sequentially connected in that order. The timing correction circuit 33 follows the viterbi decoder 25. The run length decoding circuit 35 is followed by the ECC circuit 27. The combination of the timing correction circuit 33, the ECC circuit 34, and the run length decoding circuit 35 replaces the timing correction circuit 26 in FIG. 2.

Figure 20:
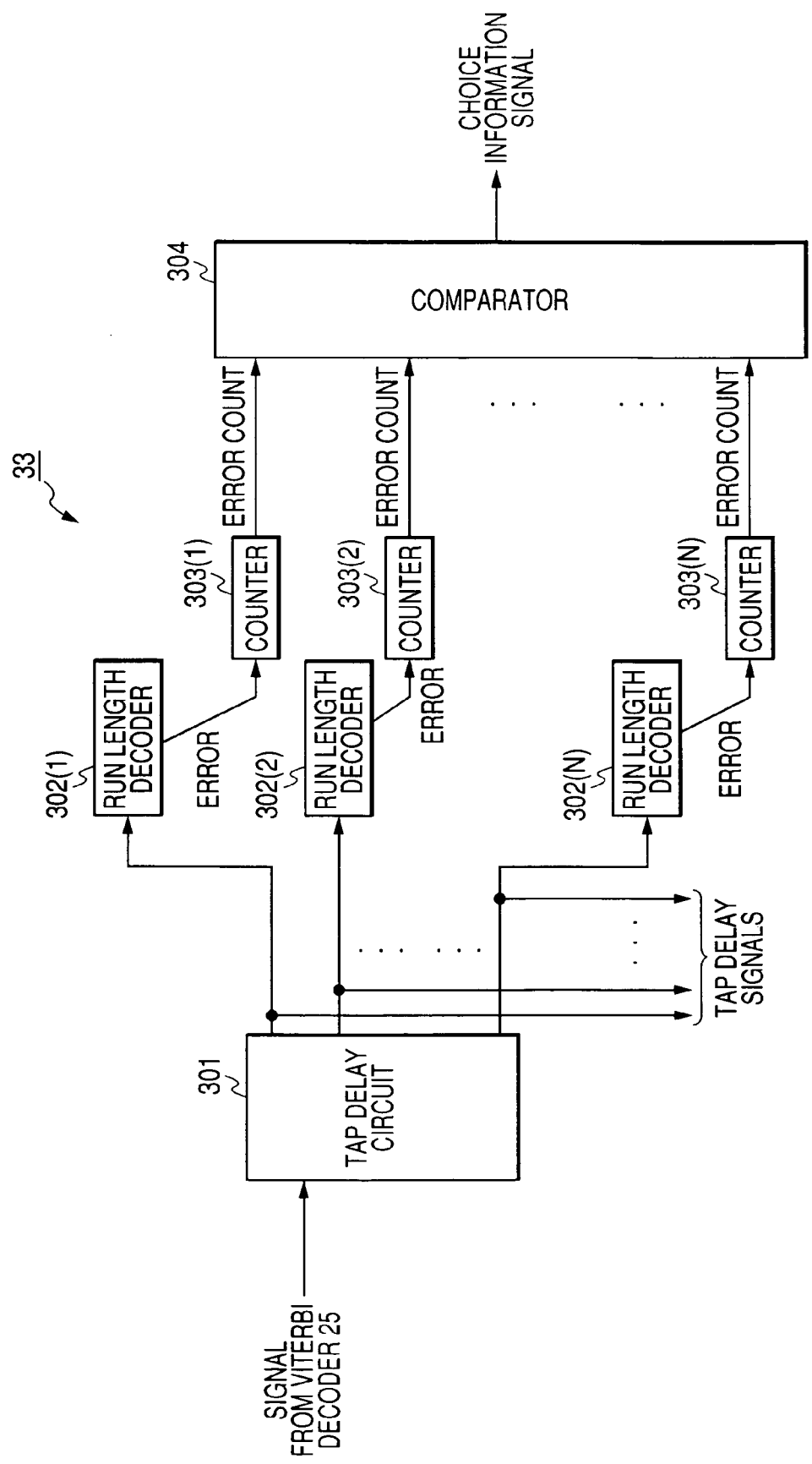
FIG. 20 is a block diagram of a first portion of a timing correction circuit in FIG. 19.
Figure 21:
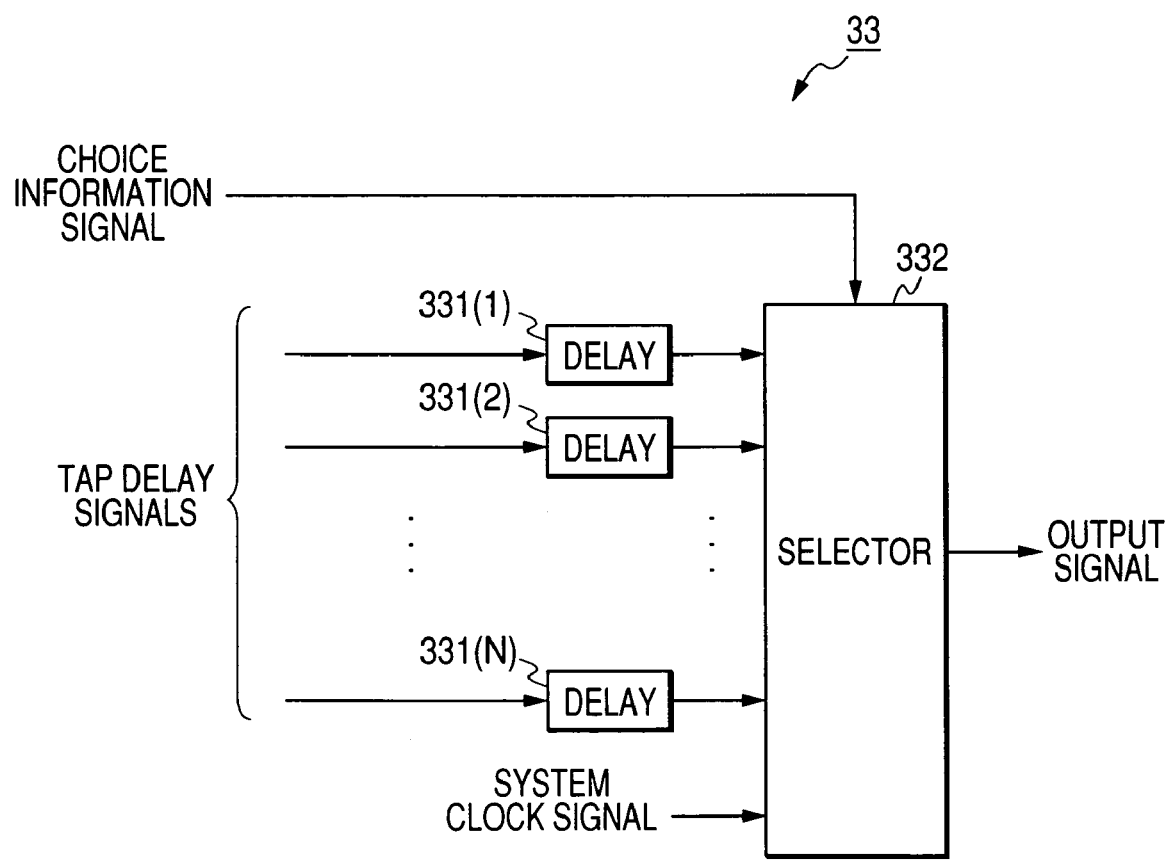
FIG. 21 is a block diagram of a second portion of the timing correction circuit in FIG. 19.

As shown in FIGS. 20 and 21, the timing correction circuit 33 includes the tap delay circuit 301, the run length decoders 302(1), 302(2), . . . , and 302(N), the counters 303(1), 303(2), . . . , and 303(N), the comparator 304, delay devices 331(1), 331(2), . . . , and 331(N), and a selector 332. The tap delay circuit 301, the run length decoders 302(1), 302(2), . . . , and 302(N), the counters 303(1), 303(2), . . . , and 303(N), the comparator 304 are similar to those in FIG. 12.

As previously mentioned, the tap delay circuit 301 generates a plurality of information bit streams which relate to respective timings spaced at 1-bit-corresponding intervals. The tap delay circuit 301 outputs the information bit streams to the delay devices 331(1), 331(2), . . . , and 332(N) respectively.

The delay devices 331(1), 331(2), . . . , and 331(N) delay the information bit streams by a prescribed time interval to get delayed information bit streams, respectively. The delay devices 331(1), 331(2), . . . , and 331(N) output the delayed information bit streams to the selector 332. The delayed information bit streams are different in timing by 1-bit-corresponding intervals. In this way, the information bit streams propagate from the tap delay circuit 301 to the selector 332 via the delay devices 331(1), 331(2), . . . , and 331(N). The signal delay provided by the delay devices 331(1), 331(2), . . . , and 331(N) is chosen to harmonize the timings of the delayed information bit streams with the timing of the choice information signal outputted from the comparator 304.

The selector 332 receives the choice information signal from the comparator 304. The selector 332 also receives the system clock signal from the suitable device (not shown). The device 332 selects one from the delayed information bit streams in response to the choice information signal while using the system clock signal as a reference timing signal. The selected information bit stream corresponds to the decided smallest error count value. The selector 332 outputs the selected information bit stream to the ECC circuit 34 as the likeliest information bit stream.

The ECC circuit 34 subjects the output signal of the selector 332 in the timing correction circuit 33 to error correction responsive to parity signals contained therein, thereby generating a first error-corrected information bit stream. The parity signals include, for example, RS code signals and LDPC signals. The ECC circuit 34 is a counterpart of the ECC parity generation circuit 18 in FIG. 18. The ECC circuit 34 outputs the first error-corrected information bit stream to the run length decoding circuit 35.

The run length decoding circuit 35 subjects the first error-corrected information bit stream (the output signal of the ECC circuit 34) to run length decoding to get a run-length-decoded signal. The run length decoding by the run length decoding circuit 35 is inverse with respect to the run length encoding by the run length encoding circuit 16 in FIG. 18. The run length decoding circuit 35 outputs the run-length-decoded signal to the ECC circuit 27.

The ECC circuit 27 subjects the run-length-decoded signal to error correction responsive to parity signals contained therein, thereby recovering original digital information. The parity signals include, for example, RS code signals and LDPC signals. The ECC circuit 27 is a counterpart of the ECC parity generation circuit 15 in FIG. 18. The ECC circuit 27 outputs the recovered digital information.

Preferably, the viterbi decoder 25 subjects the output signal of the adaptive equalization circuit 24 except parity signals added by the ECC parity generation circuit 18 in FIG. 18 to the viterbi decoding. In addition, the timing correction circuit 33 subjects the output signal of the viterbi decoder 25 except the parity signals added by the ECC parity generation circuit 18 to the timing correction procedure. Thus, the parity signals added by the ECC parity generation circuit 18 propagate from the adaptive equalization circuit 24 to the ECC circuit 34 without undergoing the viterbi decoding and the timing correction procedure.

The selector 332 may include a memory for storing the information bit streams outputted from the delay devices 331(1), 331(2), . . . , and 331(N) or the tap delay circuit 301. In this case, the selector 336 estimates likely bit positions after the occurrence of a bit slip on the basis of the choice information signal. The memory is accessed in response to the choice information signal and the estimated likely bit positions so that the information bit stream designated by the choice information signal will be read out from the memory as a selected information bit stream during a term starting from first one of the estimated likely bit positions.

Figure 22:
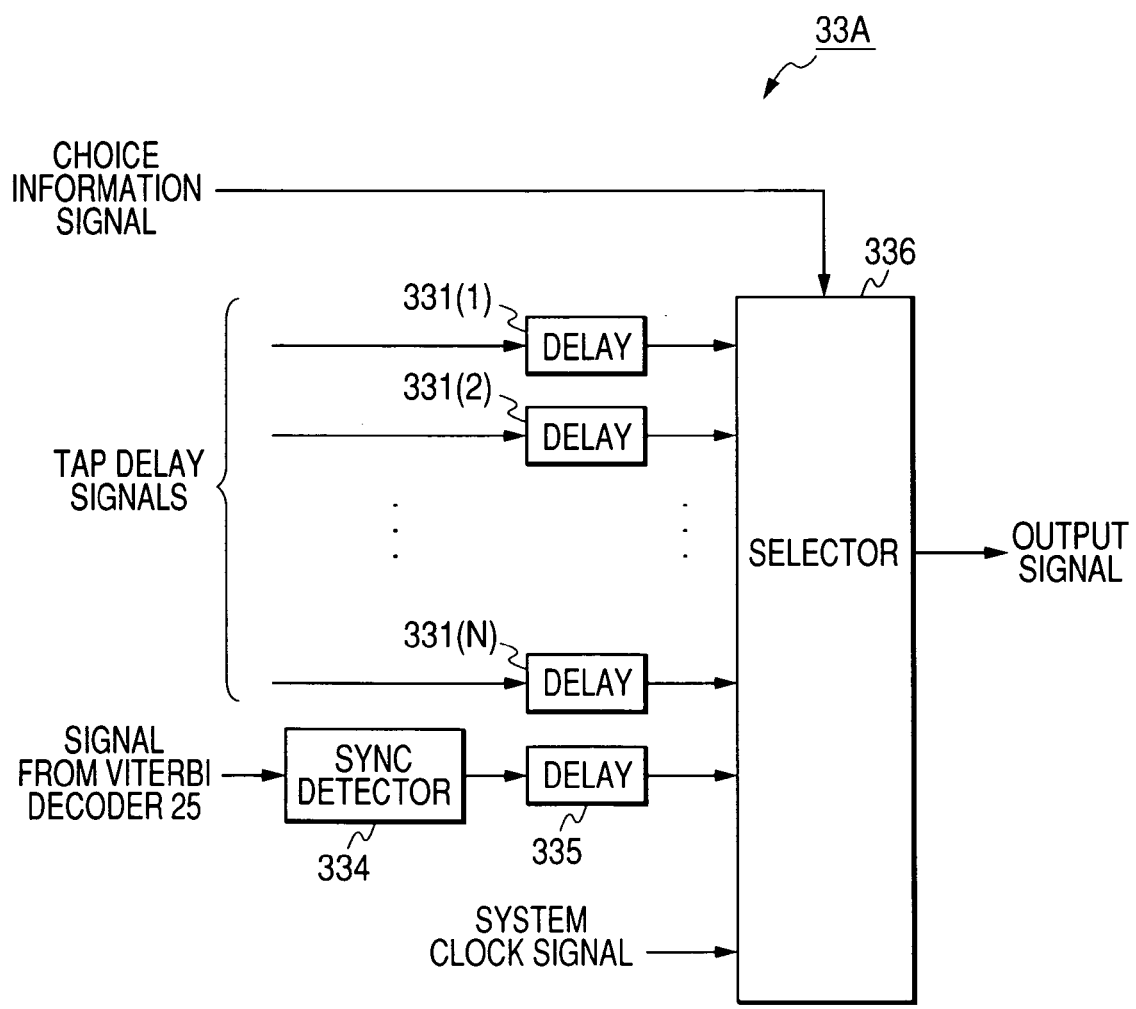
FIG. 22 is a block diagram of a portion of a timing correction circuit which can be used instead of that in FIGS. 19-21.

FIG. 22 shows a portion of a timing correction circuit 33A which may be used instead of the timing correction circuit 33. The timing correction circuit 33A is similar to the timing correction circuit 33 except for design changes as follows.

With reference to FIG. 22, the timing correction circuit 33A includes a selector 336 instead of the selector 332 (see FIG. 21). The timing correction circuit 33A further includes a sync detector 334 and a delay device 335.

The sync detector 334 receives the viterbi-decoded signal, that is, the output signal of the viterbi decoder 25 (see FIG. 19). The sync detector 334 senses every sync signal in the viterbi-decoded signal. The sync detector 334 outputs the sensed sync signal to the delay device 335. The delay device 335 delays the sync signal by a prescribed time interval to get a delayed sync signal. The delay device 335 outputs the delayed sync signal to the selector 336. The signal delay provided by the delay device 335 is chosen to harmonize the timing of the delayed sync signal with that of the choice information signal applied to the selector 336.

The selector 336 receives the information bit streams from the respective delay devices 331(1), 331(2), . . . , and 331(N). The device 336 selects one from the information bit streams which corresponds to the decided smallest error count value. The device 336 outputs the selected information bit stream as the likeliest one. The selector 336 decides correct bit positions in accordance with the sync signals fed from the delay device 335. The selector 336 implements the signal selection at a timing determined by one of the decided correct bit positions.

Specifically, the selector 336 decides correct bit positions after a bit-slip occurrence position in accordance with the choice information signal and the sync signals. For the decided correct bit positions after the bit-slip occurrence position, the device 339 selects and outputs one among the information bit streams which corresponds to the newly decided smallest error count value. In other words, the selector 339 decides a correct bit position immediately after a bit-slip occurrence position in accordance with the choice information signal and the sync signals. At a timing corresponding to the correct bit position immediately after the bit-slip occurrence position, the selector 339 changes the selected and outputted run-length-decoded signal from one to another.

The selector 336 may include a memory for storing the information bit streams outputted from the delay devices 331(1), 331(2), . . . , and 331(N) or the tap delay circuit 301. In this case, the selector 336 estimates likely bit positions after the occurrence of a bit slip on the basis of the choice information signal and the sync signals outputted from the delay device 335 or the sync detector 334. The memory is accessed in response to the choice information signal and the estimated likely bit positions so that the information bit stream designated by the choice information signal will be read out from the memory as a selected information bit stream during a term starting from first one of the estimated likely bit positions.

FOURTH EMBODIMENT

A fourth embodiment of this invention is similar to the second embodiment or the third embodiment thereof except that the tap delay circuit 301 is replaced by a modified one.

The modified tap delay circuit includes a memory rather than a cascade combination of D flip-flops. The memory stores the output signal of the viterbi decoder 25. A memory address (a pointer) for the memory is controlled so that partially-overlapping portions of the stored signal will be read out in parallel from the memory as information bit streams different in timing by 1-bit-corresponding intervals.

It should be noted that the recording side in FIG. 18 and the reproducing side in FIG. 19 may be provided in a recording apparatus and a reproducing apparatus respectively.

What is claimed is:

1. A reproducing apparatus comprising:

first means for reading out a signal of a run-length-limited code from a recording medium;

an A/D converter for converting the signal read out by the first means into a reproduced digital signal;

a decoder for subjecting the reproduced digital signal to first decoding different from run length decoding to get a first decoded signal;

second means for generating a plurality of information bit streams from every block of the first decoded signal between sync signals, the information bit streams being different in timing by 1-bit-correpsonding intervals;

run length decoders for subjecting the information bit streams to run length decoding to get run-length-decoded bit streams respectively;

third means for subjecting each of the run-length-decoded bit streams to one of error correction and error detection;

fourth means for deciding which of the run-length-decoded bit streams is the smallest in error number on the basis of results of the one of error correction and error detection; and a selector for selecting and outputting the run-length-decoded bit stream being the smallest in error number as a likeliest information bit stream.

2. A reproducing apparatus as recited in claim 1, wherein the third means comprises means for extracting specified data pieces from fixed positions in every block of each of the run-length-decoded bit streams, means for collecting a prescribed number of the extracted specified data pieces to form a code word for each of the run-length-decoded bit streams, means for decoding the code words and implementing the one of error correction and error detection on the code words to get error signals representative of numbers of errors in the code words for the run-length-decoded bit streams; and wherein the fourth means and the selector comprise means for comparing the error signals to decide which of the code words is the smallest in error number, and means for selecting and outputting the run-length-decoded bit stream corresponding to the code word being the smallest in error number as the likeliest information bit stream.

3. A reproducing apparatus as recited in claim 1, wherein the second means comprises a tap delay circuit for non-delaying and delaying every block of the first decoded signal by terms different by 1-bit-correpsonding intervals to generate the information bit streams;

wherein the run length decoders comprise means for generating error signals in cases where unnatural code words and unnatural state transitions occur during the run length decoding; and wherein the fourth means comprises counters for counting the error signals generated by the run length decoders for every prescribed number of bits, and for accumulating results of the counting during prescribed terms to get error count numbers respectively, and a comparator for comparing the error count numbers to decide which of the count numbers is the smallest, and for designating one of the run-length-decoded bit streams which corresponds to the decided smallest count number as the run-length-decoded bit stream being the smallest in error number.

4. A reproducing apparatus as recited in claim 3, wherein the run length decoders obtain error decision results during the run length decoding and calculate the differences between the error decision results and the information bit streams as Euclidean distances, and generate the error signals in response to ones of (1) the squares of the Euclidean distances and (2) the absolute values of the Euclidean distances.

5. A reproducing apparatus as recited in claim 3, wherein the selector comprises a sync signal detector for detecting every sync signal in the first decoded signal, and the comparator detects occurrence of a bit slip in response to the error count numbers; and wherein the selector estimates a likely bit position immediately after the occurrence of the bit slip in response to the sync signal detected by the sync signal detector when the comparator detects the occurrence of the bit slip, and the selector changes the selected and outputted run-length-decoded bit stream from one to another at a moment corresponding to the estimated likely bit position immediately after the occurrence of the bit slip.

6. A reproducing apparatus as recited in claim 5, wherein the comparator generates a choice information signal for changing the selected and outputted run-length-decoded bit stream from one to another when detecting the occurrence of the bit slip; and wherein the selector comprises means for estimating the likely bit position immediately after the occurrence of the bit slip in response to the choice information signal generated by the comparator and the sync signal detected by the sync signal detector, and for changing the selected and outputted run-length-decoded bit stream from one to another at the moment corresponding to the estimated likely bit position immediately after the occurrence of the bit slip.

7. A reproducing apparatus comprising:

first means for reading out a signal of a run-length-limited code from a recording medium;

an A/D converter for converting the signal read out by the first means into a reproduced digital signal;

a decoder for subjecting the reproduced digital signal to first decoding different from run length decoding to get a first decoded signal;

second means for generating a plurality of information bit streams from every block of the first decoded signal between sync signals, the information bit streams being different in timing by 1-bit-correpsonding intervals;

run length decoders for subjecting the information bit streams to run length decoding to get run-length-decoded bit streams respectively;

third means for subjecting each of the run-length-decoded bit streams to one of error correction and error detection;

fourth means for deciding which of the run-length-decoded bit streams is the smallest in error number on the basis of results of the one of error correction and error detection; and a selector for selecting and outputting one among the information bit streams which corresponds to the run-length-decoded bit stream being the smallest in error number as a likeliest information bit stream.

8. A reproducing apparatus as recited in claim 7, wherein the second means comprises a tap delay circuit for non-delaying and delaying every block of the first decoded signal by terms different by 1-bit-correpsonding intervals to generate the information bit streams;

wherein the run length decoders comprise means for generating error signals in cases where unnatural code words and unnatural state transitions occur during the run length decoding;

wherein the fourth means comprises counters for counting the error signals generated by the run length decoders for every prescribed number of bits, and for accumulating results of the counting during prescribed terms to get error count numbers respectively, and a comparator for comparing the error count numbers to decide which of the count numbers is the smallest, and for designating one of the information bit streams which corresponds to the decided smallest count number as the information bit stream being the smallest in error number;

wherein the selector comprises a sync signal detector for detecting every sync signal in the first decoded signal, and the comparator detects occurrence of a bit slip in response to the error count numbers; and wherein the selector estimates a likely bit position immediately after the occurrence of the bit slip in response to the sync signal detected by the sync signal detector when the comparator detects the occurrence of the bit slip, and the selector changes the selected and outputted information bit stream from one to another at a moment corresponding to the estimated likely bit position immediately after the occurrence of the bit slip.

9. A reproducing apparatus as recited in claim 8, wherein the comparator generates a choice information signal for changing the selected and outputted information bit stream from one to another when detecting the occurrence of the bit slip; and
wherein the selector comprises means for estimating the likely bit position immediately after the occurrence of the bit slip in response to the choice information signal generated by the comparator and the sync signal detected by the sync signal detector, and for changing the selected and outputted information bit stream from one to another at the moment corresponding to the estimated likely bit position immediately after the occurrence of the bit slip.

10. A reproducing apparatus as recited in claim 8, wherein the selector comprises means for counting pulses of a fixed-frequency clock signal from the next sync signal position detected by the sync signal detector, and means for estimating a position at which the bit stream having the smallest counting of the pulses is changed to be the likely bit position immediately after the occurrence of the bit slip.

11. A reproducing method comprising the steps of:
reading out a signal of a run-length-limited code from a recording medium;
converting the read-out signal into a reproduced digital signal;
subjecting the reproduced digital signal to first decoding different from run length decoding to get a first decoded signal;
generating a plurality of information bit streams from every block of the first decoded signal between sync signals, the information bit streams being different in timing by 1-bit-correpsonding intervals;
subjecting the information bit streams to run length decoding to get run-length-decoded bit streams;
subjecting each of the run-length-decoded bit streams to one of error correction and error detection;
deciding which of the run-length-decoded bit streams is the smallest in error number on the basis of results of the one of error correction and error detection; and
selecting and outputting one among the information bit streams which corresponds to the run-length-decoded bit stream being the smallest in error number as a likeliest information bit stream.

12. A recording and reproducing apparatus comprising:
a parity generation circuit for generating error correction parity signals in response to input digital information, and for adding the generated error correction parity signals to the input digital information to form parity-added digital information;
a run length encoding circuit for subjecting the parity-added digital information to run length encoding to get a signal of a run length limited code;
first means for recording the signal of the run length limited code on a recording medium;
second means for reading out the signal of the run-length-limited code from the recording medium;
an A/D converter for converting the signal read out by the second means into a reproduced digital signal;
a decoder for subjecting the reproduced digital signal to first decoding different from run length decoding to get a first decoded signal;
third means for generating a plurality of information bit streams from every block of the first decoded signal between sync signals, the information bit streams being different in timing by 1-bit-correpsonding intervals;
run length decoders for subjecting the information bit streams to run length decoding to get run-length-decoded bit streams respectively;
fourth means for subjecting each of the run-length-decoded bit streams to one of error correction and error detection;
fifth means for deciding which of the run-length-decoded bit streams is the smallest in error number on the basis of results of the one of error correction and error detection; and
a selector for selecting and outputting one among the information bit streams which corresponds to the run-length-decoded bit stream being the smallest in error number as a likeliest information bit stream.

13. A reproducing apparatus as recited in claim 8, wherein the selector comprises means for counting pulses of a fixed-frequency clock signal during a term defined by the sync signal detected by the sync signal detector, and means for estimating the likely bit position immediately after the occurrence of the bit slip in response to results of the counting of the pulses.

14. A recording and reproducing apparatus comprising:
a parity generation circuit for generating error correction parity signals in response to input digital information, and for adding the generated error correction parity signals to the input digital information to form parity-added digital information;
a run length encoding circuit for subjecting the parity-added digital information to run length encoding to get a first signal of a run length limited code;
first means for recording the first signal of the run length limited code on a first recording medium;
second means for reading out a second signal of the run-length-limited code from one of the first recording medium and a second recording medium which has been recorded by an apparatus different from the present apparatus, the second recording medium being different from the first recording medium;
an A/D converter for converting the signal read out by the second means into a reproduced digital signal;
a decoder for subjecting the reproduced digital signal to first decoding different from run length decoding to get a first decoded signal;
third means for generating a plurality of information bit streams from every block of the first decoded signal between sync signals, the information bit streams being different in timing by 1-bit-correpsonding intervals;
run length decoders for subjecting the information bit streams to run length decoding to get run-length-decoded bit streams respectively;
fourth means for subjecting each of the run-length-decoded bit streams to one of error correction and error detection;
fifth means for deciding which of the run-length-decoded bit streams is the smallest in error number on the basis of results of the one of error correction and error detection; and
a selector for selecting and outputting one among the information bit streams which corresponds to the run-length-decoded bit stream being the smallest in error number as a likeliest information bit stream.

* * * * *